US009765984B2

(12) United States Patent
Smith et al.

(10) Patent No.: US 9,765,984 B2
(45) Date of Patent: Sep. 19, 2017

(54) THERMOSTAT TEMPERATURE COMPENSATION MODELING

(71) Applicant: TRANE INTERNATIONAL INC., Piscataway, NJ (US)

(72) Inventors: Christopher Blake Smith, Whitehouse, TX (US); Kit W. Klein, Tyler, TX (US); James Wiltzius, Forest Lake, MN (US); Joseph George Land, III, Tyler, TX (US)

(73) Assignee: TRANE INTERNATIONAL INC., Davidson, NC (US)

( * ) Notice: Subject to any disclaimer, the term of this patent is extended or adjusted under 35 U.S.C. 154(b) by 666 days.

(21) Appl. No.: 14/263,691

(22) Filed: Apr. 28, 2014

(65) Prior Publication Data

US 2015/0285526 A1    Oct. 8, 2015

Related U.S. Application Data

(60) Provisional application No. 61/974,386, filed on Apr. 2, 2014.

(51) Int. Cl.
    *G01M 1/38*     (2006.01)
    *F24F 11/00*    (2006.01)

(52) U.S. Cl.
    CPC .......... *F24F 11/006* (2013.01); *F24F 11/001* (2013.01); *F24F 2011/0071* (2013.01)

(58) Field of Classification Search
    None
    See application file for complete search history.

(56) References Cited

U.S. PATENT DOCUMENTS

| | | | | |
|---|---|---|---|---|
| 4,794,537 A | * | 12/1988 | Adasek | B60H 1/00814 237/5 |
| 5,400,964 A | * | 3/1995 | Freiberger | G05D 23/27 236/91 C |
| 6,157,943 A | | 12/2000 | Meyer | |
| 6,234,398 B1 | * | 5/2001 | Pawlak, III | B60H 1/00735 236/91 C |
| 6,385,510 B1 | * | 5/2002 | Hoog | F24F 11/0086 379/102.05 |
| 6,423,118 B1 | * | 7/2002 | Becerra | B01D 46/0086 95/19 |
| 7,031,880 B1 | | 4/2006 | Seem et al. | |
| 7,113,086 B2 | | 9/2006 | Shorrock | |
| 7,337,191 B2 | | 2/2008 | Haeberle et al. | |

(Continued)

FOREIGN PATENT DOCUMENTS

| | | |
|---|---|---|
| CA | 2045202 | 12/1991 |
| CA | 2633200 | 9/2008 |

(Continued)

*Primary Examiner* — Wissam Rashid
(74) *Attorney, Agent, or Firm* — Hamre, Schumann, Mueller & Larson, P.C.

(57) ABSTRACT

Systems and methods for configuring a temperature control system of a heating, ventilation, and air conditioning (HVAC) system controller are described. The HVAC system controller includes a processor in communication with a memory and a user interface. The processor is configured to determine a dynamic parameter related to a dynamic property of a conditioned space and maintain a controlled environment within the conditioned space by utilizing the dynamic parameter.

20 Claims, 13 Drawing Sheets

(56) References Cited

U.S. PATENT DOCUMENTS

| | | | |
|---|---|---|---|
| 8,190,273 B1* | 5/2012 | Federspiel | F24F 11/006 700/17 |
| 8,196,185 B2 | 6/2012 | Geadelmann et al. | |
| 8,239,922 B2 | 8/2012 | Sullivan et al. | |
| 8,387,891 B1 | 3/2013 | Simon et al. | |
| 8,517,088 B2 | 8/2013 | Moore et al. | |
| D689,895 S | 9/2013 | DeLuca | |
| 8,523,084 B2 | 9/2013 | Siddaramanna et al. | |
| 8,528,831 B2 | 9/2013 | Lin et al. | |
| 8,854,202 B2 | 10/2014 | Anderson, Jr. et al. | |
| 8,893,006 B2 | 11/2014 | Haeberle et al. | |
| 8,933,930 B2 | 1/2015 | Han et al. | |
| 2004/0016817 A1* | 1/2004 | Pawlak, III | B60H 1/00735 236/49.3 |
| 2005/0189429 A1* | 9/2005 | Breeden | F23N 5/203 236/46 R |
| 2011/0040550 A1* | 2/2011 | Graber | G06Q 10/06 703/18 |
| 2013/0204442 A1 | 8/2013 | Modi et al. | |

FOREIGN PATENT DOCUMENTS

| | | |
|---|---|---|
| CA | 2687212 | 11/2008 |
| CA | 2737970 | 10/2011 |
| CA | 2798175 | 6/2013 |
| EP | 2604936 | 6/2013 |
| EP | 2618233 | 7/2013 |
| WO | 2005086815 | 9/2005 |
| WO | 2007027646 | 3/2007 |
| WO | 2009006133 | 1/2009 |
| WO | 2010059143 | 5/2010 |
| WO | 2012031351 | 3/2012 |
| WO | 2012068447 | 5/2012 |
| WO | 2012068453 | 5/2012 |
| WO | 2012068495 | 5/2012 |
| WO | 2012068517 | 5/2012 |
| WO | 2012142477 | 10/2012 |
| WO | 2012174130 | 12/2012 |
| WO | 2013052905 | 4/2013 |
| WO | 2013058820 | 4/2013 |
| WO | 2013058933 | 4/2013 |
| WO | 2013058934 | 4/2013 |

* cited by examiner

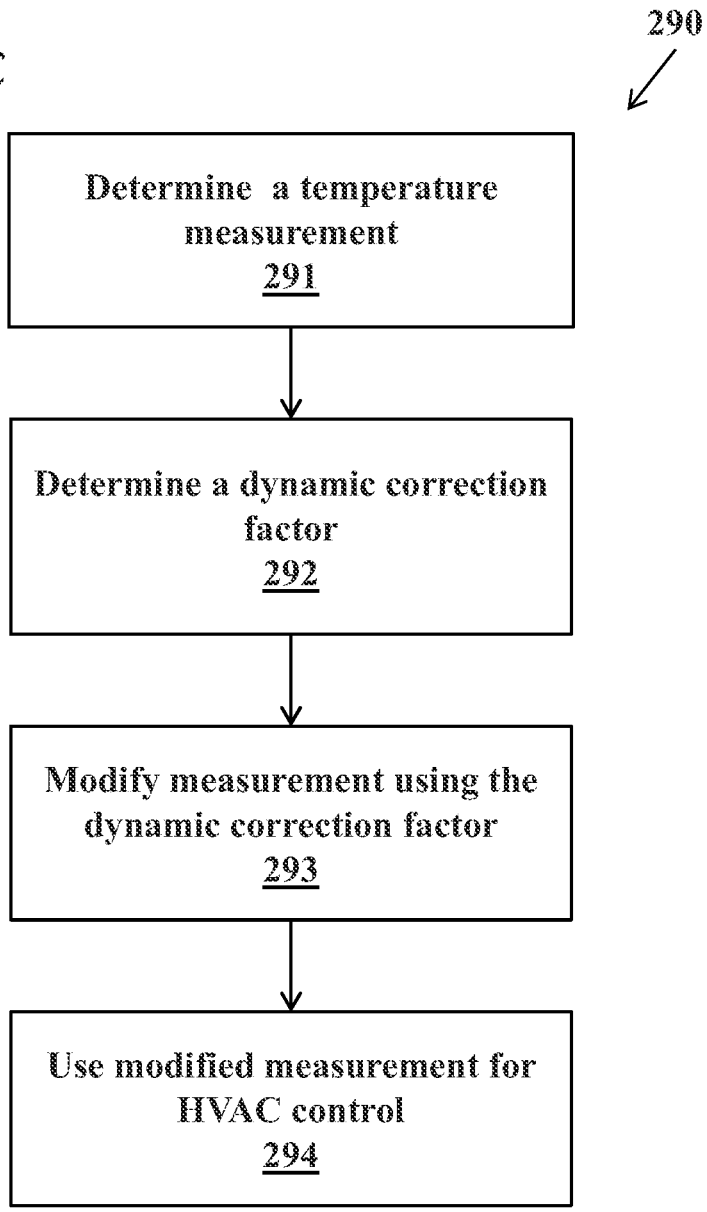

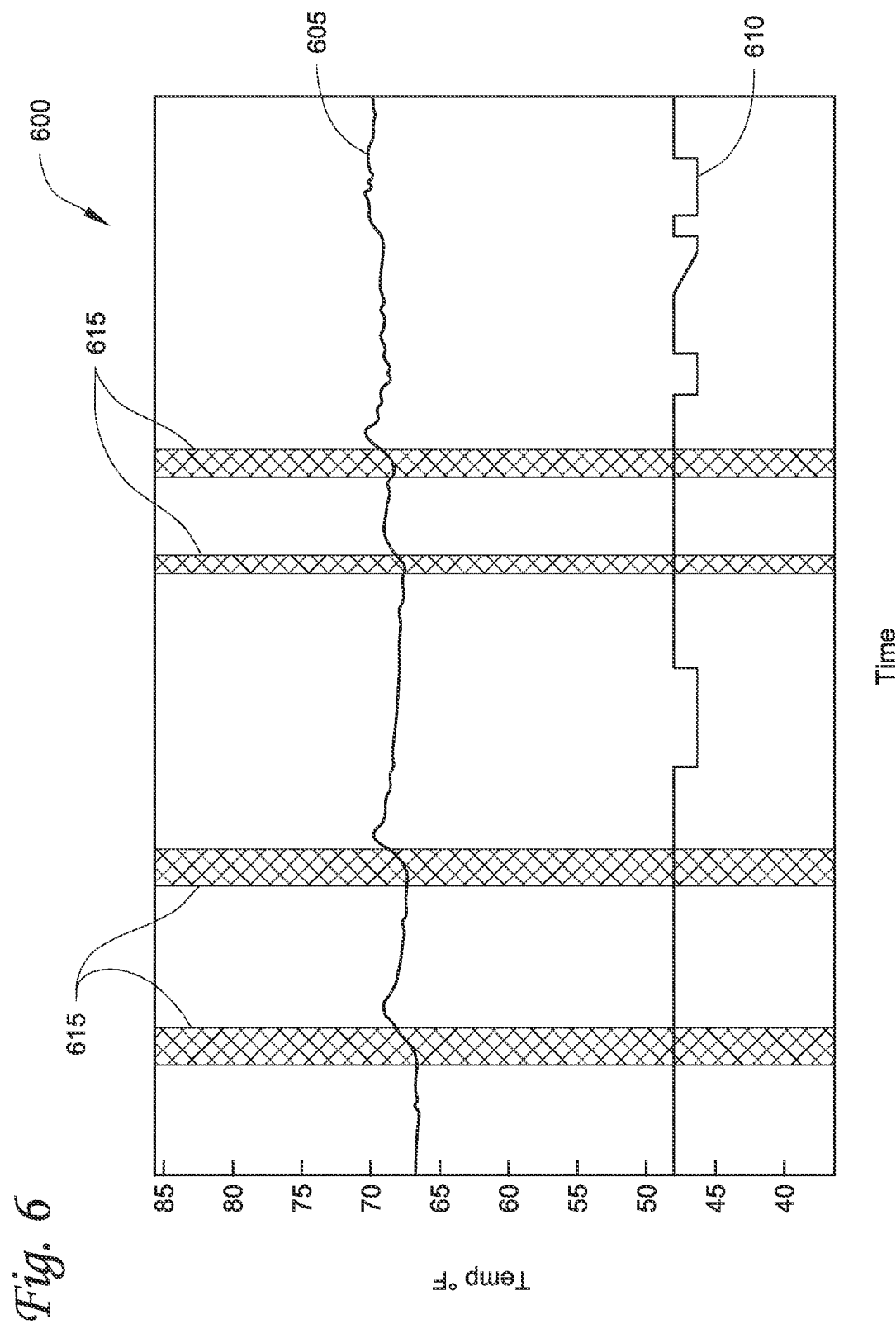

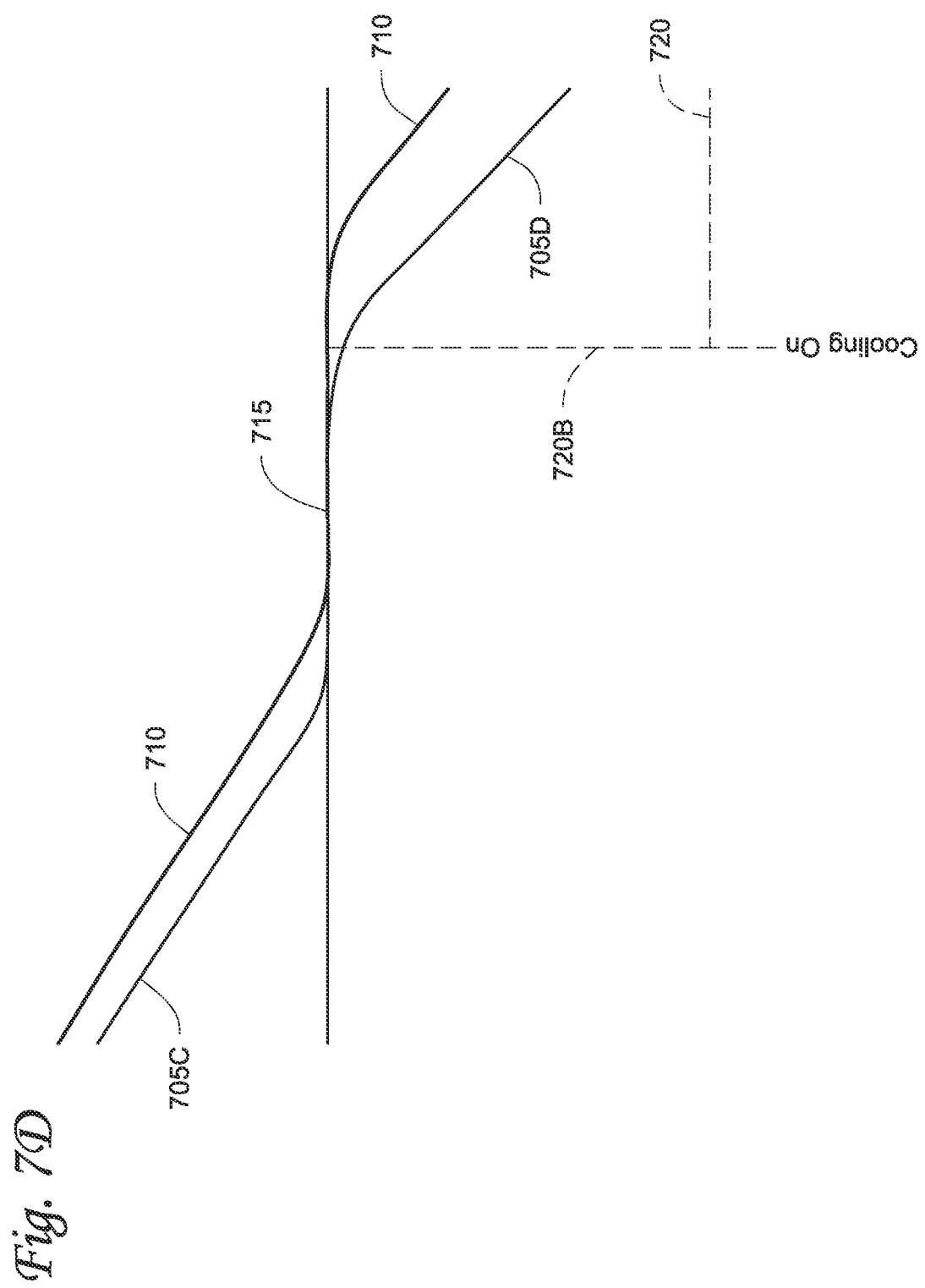

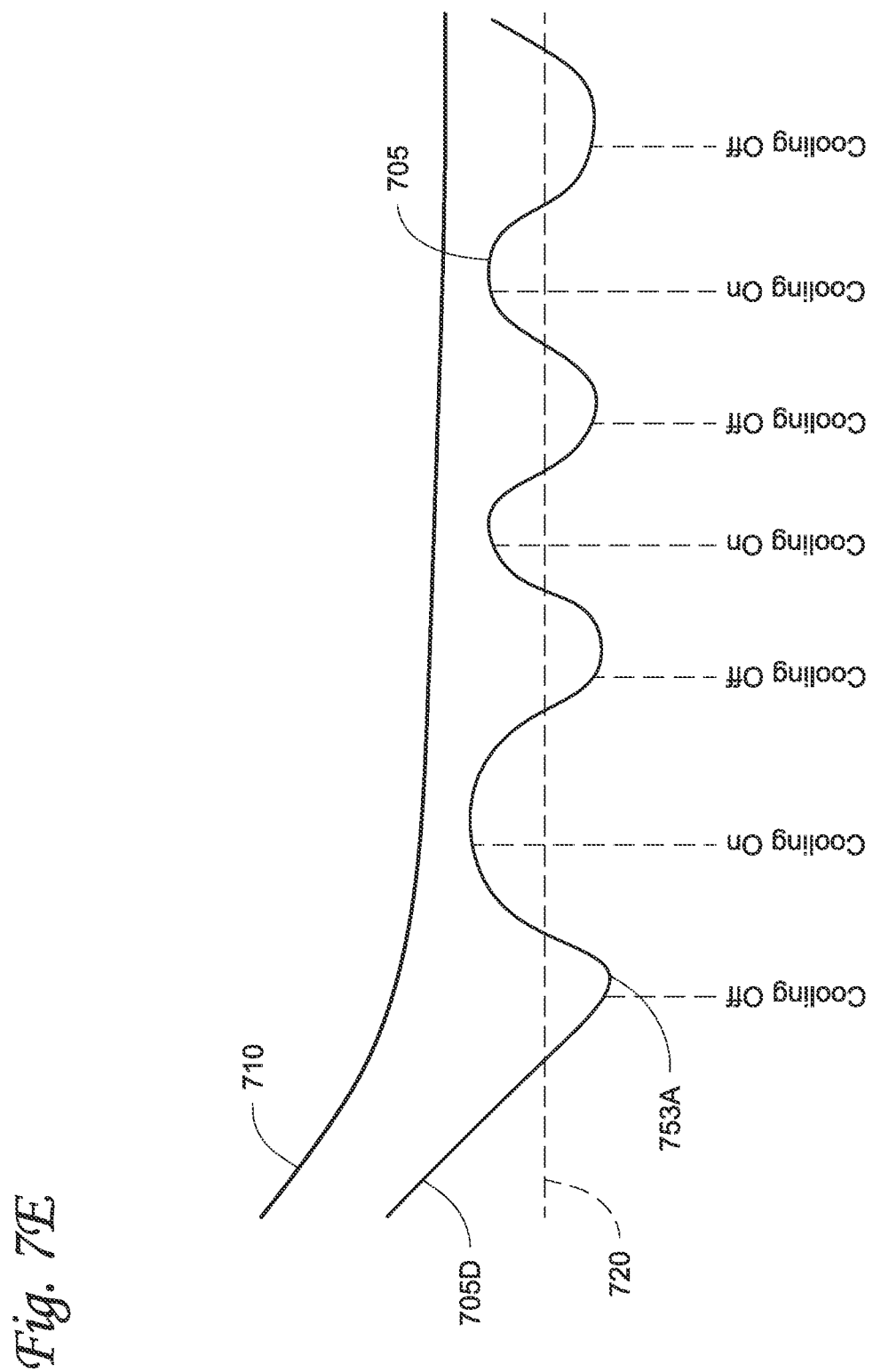

THERMOSTAT TEMPERATURE COMPENSATION MODELING

FIELD

This disclosure relates generally to a heating, ventilation, and air conditioning (HVAC) system. More specifically, the disclosure relates to temperature control in an HVAC system.

BACKGROUND

A heating, ventilation, and air conditioning (HVAC) system generally includes equipment configured to control one or more environmental conditions such as, but not limited to, temperature, humidity, and/or air quality, or the like. The function and control of the HVAC equipment is typically adjusted by a thermostat, which can be connected to an HVAC system controller. A thermostat can alternatively be a part of the HVAC system controller. An HVAC system controller can generate heat that can affect its ability to correctly control temperature. In some HVAC systems, an HVAC system controller includes a central processing unit (CPU), a temperature sensor, a display, and/or other circuitry that generates thermal energy during operation. The HVAC system controller is designed to isolate the temperature sensor from the heat generating sources to minimize the effect of the thermal energy on the temperature measurement. Venting of the thermal energy can generate internal airflow through the HVAC system controller that effects temperature sensor measurements. Additionally, airflows in a room can affect the internal airflow through the HVAC system controller, which can further affect the temperature measurements.

SUMMARY

This disclosure relates generally to a heating, ventilation, and air conditioning (HVAC) system. More specifically, the disclosure relates to temperature control in an HVAC system.

In some embodiments, an HVAC system controller includes a dynamic calibration mode. The dynamic calibration mode can be executed by an HVAC system controller in order to determine a dynamic correction factor for one or more sensors in the HVAC system. In some embodiments, one or more of the one or more sensors can be integral with the HVAC system controller. In other embodiments, one or more of the one or more sensors can be external to the HVAC system controller.

In some embodiments, the HVAC system controller can enable one or more fans within an HVAC system when executing the dynamic calibration mode.

In other embodiments, the HVAC system controller can enable one or more of the fans and can enable a heating mode when executing the dynamic calibration mode. In some embodiments, the HVAC system controller can be configured to include one or more dynamic calibration conditions in order to prevent the HVAC system controller from enabling the heating mode. Examples of the one or more dynamic calibration conditions include, but are not limited to, a high ambient temperature, a time of year, a time of day, or the like. The one or more dynamic calibration conditions can, for example, prevent the HVAC system controller from running the heating mode in the dynamic calibration mode when the ambient temperature is high.

In other embodiments, the HVAC system controller can enable one or more of the fans and can enable a cooling mode when executing the dynamic calibration mode. In some embodiments, the HVAC system controller can be configured to include one or more dynamic calibration conditions in order to prevent the HVAC system controller from enabling the cooling mode. Examples of the one or more dynamic calibration conditions include, but are not limited to, a low ambient temperature, a time of year, a time of day, or the like. The one or more dynamic calibration conditions can, for example, prevent the HVAC system controller from running the cooling mode in the dynamic calibration mode when the ambient temperature is too low, which can, for example, cause damage to the HVAC system.

In some embodiments, the HVAC system controller can enable one or more of the fans and can enable one or more additional systems. For example, in some embodiments, the HVAC system controller can be in communication with one or more additional systems such as, but not limited to, one or more ceiling fans, one or more lights, one or more secondary heat sources, or the like. In such embodiments, the HVAC system controller can enable one or more of the fans and one or more of the systems during the dynamic calibration mode. In some embodiments, the HVAC system controller can monitor one or more peripheral devices (e.g., a humidifier, a heat recovery ventilator, an ultraviolet (UV) light generator, or the like).

In some embodiments, the HVAC system controller can be in communication with one or more sensors indicating a state of one or more aspects of the conditioned space, such as, but not limited to, a position of one or more doors (e.g., opened or closed), a position of one or more windows (e.g., opened or closed), a position of one or more window shades (e.g., opened or closed), or the like. In such embodiments, the HVAC system controller can account for the state of the sensor in determining the dynamic correction factor.

In some embodiments, a sensor that is in communication with the HVAC controller can be affected by one or more monitoring conditions causing it to incorrectly identify a temperature. Examples of the one or more monitoring conditions include, but are not limited to, direct sunlight, heat from the sensor itself, heat from a nearby heat source (e.g., a fireplace, vent, or the like), or the like. In such embodiments, the HVAC system controller can be executed in a calibration mode to identify an appropriate correction factor.

In some embodiments, an HVAC system controller can be placed in the dynamic calibration mode at the time of installing the HVAC system controller in an HVAC system. In other embodiments, the HVAC system controller can be placed in the dynamic calibration mode and configured or reconfigured once the HVAC system controller has already been installed.

In some embodiments, the dynamic calibration mode can be used to estimate a thermal mass of a conditioned space. In some embodiments, the thermal mass of the conditioned space can be used to estimate a thermal core temperature. In some embodiments, the thermal core temperature may not reach a set point temperature for the conditioned space. A difference between the thermal core temperature and the set point temperature can be used to indicate inefficiencies in the conditioned space. Examples of inefficiencies in the conditioned space include, but are not limited to, limited insulation; loss of thermal energy through windows, doors, or the like; construction materials; secondary heat sources; or the like. This difference, however, can be an indication that another type of heating, for example radiant heating, which will affect the thermal core temperature, may be beneficial.

A heating, ventilation, and air conditioning (HVAC) system controller is described. The HVAC system controller includes a processor in communication with a memory and a user interface. The processor is configured to determine a dynamic parameter related to a dynamic property of a conditioned space and maintain a controlled environment within the conditioned space by utilizing the dynamic parameter.

A method for configuring a temperature control system of a heating, ventilation, and air conditioning (HVAC) system controller is described. The method includes enabling one or more fans in an HVAC system for a fan-enabled time period and monitoring temperature of a conditioned space determined by a sensor in the HVAC system during the fan-enabled time period. The method further includes disabling the one or more fans in the HVAC system for a fan-disabled time period and monitoring temperature of the conditioned space by the sensor in the HVAC system during the fan-disabled time period. The HVAC system controller determines a dynamic correction factor based on the temperatures monitored during the fan-enabled and fan-disabled time periods.

A method for controlling a heating, ventilation, and air conditioning (HVAC) system is described. The method includes determining a temperature measurement by an HVAC system controller. The HVAC system controller determines a dynamic correction factor based on one or more dynamic parameters and modifies the temperature measurement based on the dynamic correction factor. The method further includes controlling the HVAC system based on the modified temperature measurement.

A heating, ventilation, and air conditioning (HVAC) system controller is described. The HVAC system controller includes a processor in communication with a memory and a user interface. The processor is configured to enable one or more fans in an HVAC system for a fan-enabled time period and monitor a temperature determined by a sensor in the HVAC system during the fan-enabled time period. The processor is further configured to disable the one or more fans in the HVAC system for a fan-disabled time period and monitor a temperature determined by a sensor in the HVAC system during the fan-disabled time period. The processor is configured to determine a dynamic correction factor based on the temperatures monitored in the fan-enabled and the fan-disabled time periods.

BRIEF DESCRIPTION OF THE DRAWINGS

References are made to the accompanying drawings that form a part of this disclosure, and which illustrate the embodiments in which the systems and methods described in this Specification can be practiced.

FIG. 2C illustrates a method to dynamically correct a temperature measurement using an HVAC system controller for a particular HVAC system and/or sensor, according to some embodiments.

FIG. 6 illustrates a plot of temperature over time for a conditioned space, according to some embodiments.

FIGS. 7B-7E illustrate detailed views of portions of FIG. 7A.

Like reference numbers represent like parts throughout.

DETAILED DESCRIPTION

Figure 1:
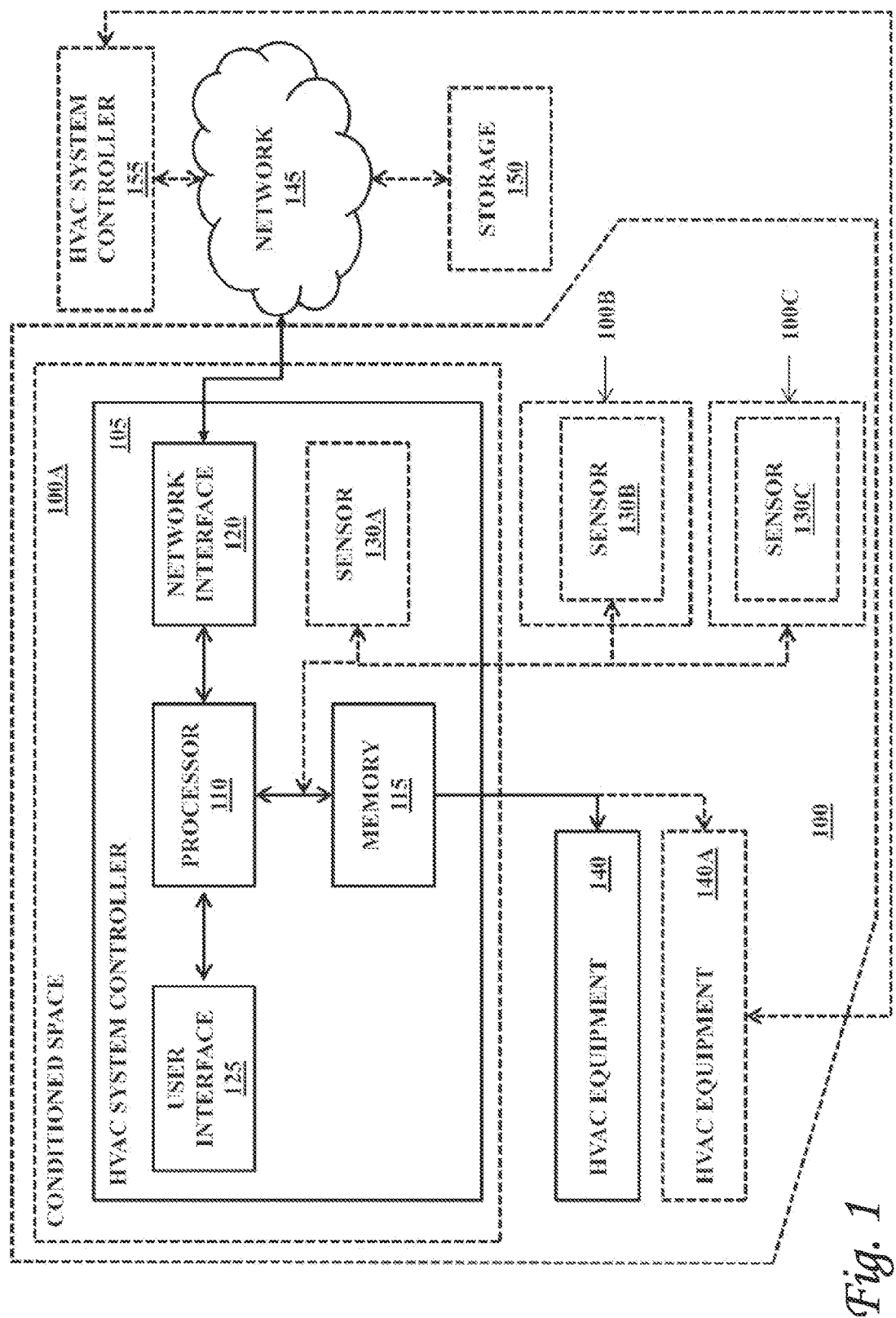
FIG. 1 illustrates a schematic diagram of a heating, ventilation, and air conditioning (HVAC) system controller connected to HVAC equipment and a network, according to some embodiments.

This disclosure relates generally to a heating, ventilation, and air conditioning (HVAC) system. More specifically, the disclosure relates to temperature control in an HVAC system.

An HVAC system generally includes an HVAC system controller and equipment configured to control one or more environmental conditions such as, but not limited to, temperature, humidity, and/or air quality, or the like. The HVAC system controller can be configured to control one or more operations of the equipment. An example of an HVAC system controller includes, but is not limited to, a configurable thermostat (or can include a configurable thermostat) and can be configured, for example, to control the HVAC equipment to maintain a desired temperature in a space conditioned ("conditioned space") by the HVAC equipment.

The components of an HVAC system controller can generate heat during operation. This heat can result in temperature measurements that do not reflect the actual temperature of a conditioned space. For example, the internal temperature can be several degrees higher than the air temperature of the conditioned space. Known solutions have included venting the heat generated by the components out of the HVAC system controller. Venting and isolating heat-generating components from the temperature sensor and use of static calibration offsets has been effective when the heat generated is relatively small. Newer HVAC system controllers using color displays can generate a significant amount of heat. This can, for example, lead to a slow response time when the HVAC system is operating in a heating mode. In a cooling mode, this can cause short cycling. This can be particularly problematic in an HVAC system controller including a color display, as the amount of heat generated increases over an HVAC system controller without a color display. When the HVAC system is in operation, airflow through the conditioned space can further impact the temperature measurements obtained by the HVAC system controller.

A "dynamic correction factor" includes, for example, an offset that can account for dynamic operation of an HVAC system. The dynamic correction factor can account for heat generated by one or more components of the HVAC system (e.g., a sensor, an HVAC system controller, or the like). The dynamic correction factor can account for a time dynamic bias in sensor measurements to provide conditioned air in accordance with a set point of an HVAC system controller. The dynamic correction factor can include one or more of a temporal component, an airflow component (e.g., variable speed fans), a temperature offset component, and/or a constant, or the like.

A "dynamic calibration mode" includes, for example, a mode of determining a dynamic correction factor. The dynamic calibration mode can also be referred to as the smart optimization mode. In some embodiments, the dynamic calibration mode can include determining a temperature versus time plot during a fan enabled mode and a fan disabled mode for an HVAC system. A curve-fitting algorithm can be used to obtain a dynamic correction factor based on the temperature versus time plots. Examples of suitable curve-fitting algorithms include, but are not limited to, linear, exponential, or the like.

A "thermal mass of a conditioned space" is, for example, indicative of the ability of the conditioned space to store thermal energy. A variety of factors can influence the thermal mass of the conditioned space. Examples of factors influencing the thermal mass include, but are not limited to, construction materials (e.g., internal materials such as, but not limited to, carpet, tile, or the like; and/or materials used for structure such as, but not limited to, brick, concrete, or the like); insulation; size and/or location of ductwork; secondary heat sources (e.g., sunlight); or the like.

A "thermal core temperature of a conditioned space" includes, for example, a temperature estimation of a mass of the conditioned space. The thermal core temperature can, for example, be affected by a thermal mass of the conditioned space. Accordingly, factors influencing the thermal mass of the conditioned space can also influence the thermal core temperature of the conditioned space.

A "dynamic parameter" includes, for example, a parameter of a conditioned space that can be dynamically changing. Examples of dynamic parameters include, but are not limited to, airflows; secondary heat sources (such as, but not limited to, fireplaces, space heaters, sunlight, cooking sources (e.g., stoves, ovens, grills, or the like), or the like); energy losses detectable by home automation sensors and capable of being reported to an HVAC system controller (such as, but not limited to, those caused by opening of doors, garage doors, windows, exhaust fans, or the like); losses based on thermal mass of a conditioned space (discussed in additional detail below); properties not related directly to temperature (such as, but not limited to, sources of humidity (e.g., pools, hot tubs, saunas, or the like), clothes dryers, automatic dishwashers, showers, bathrooms, or the like); or other similar parameters that can change over time and can affect environmental control of the conditioned space.

FIG. 1 illustrates a schematic diagram of a heating, ventilation, and air conditioning (HVAC) system controller 105 connected to HVAC equipment 140 and a network 145. The HVAC system controller 105 is disposed in a conditioned space 100. The conditioned space 100 includes the conditioned space 100A and can include conditioned space 100B and 100C. It is to be appreciated that the conditioned space 100 can include fewer or additional conditioned spaces similar to 100A-100C.

The conditioned space 100A can be, for example, a portion of a home, building, or the like. The HVAC system controller 105 can be configured to control one or more operations of the HVAC equipment 140. In some embodiments, the HVAC system controller 105 can also be configured to control one or more operations of additional HVAC equipment 140A. For example, the HVAC system controller 105 can be a configurable thermostat (or include a configurable thermostat) and the HVAC equipment 140, 140A can be a furnace, with the configurable thermostat configured to control the furnace to, for example, maintain a desired temperature in one or more of the conditioned spaces 100A-100C. It is to be appreciated that the conditioned space, as used herein, can include an entire structure (e.g., a house, garage, or the like) or can include only a portion of the structure (e.g., a room in a house, a floor of a house, or the like). The HVAC equipment 140,140A can represent any of a variety of equipment configured for use in an HVAC system. For example, the HVAC equipment 140, 140A can represent a furnace, an air conditioning unit, or the like.

The HVAC system controller 105 includes a processor 110 in communication with a memory 115, a network interface 120, and a user interface 125. The HVAC system controller 105 and the dynamic calibration modes described herein can be configured to control an environmental condition other than temperature, such as, but not limited to, monitoring air quality, humidity, or the like, in one or more of the conditioned spaces 100A-100C. In some embodiments, the HVAC system controller 105 can be programmed to monitor additional aspects of the HVAC system.

The processor 110 is configured to retrieve and execute programming instructions stored in the memory 115. For example, the processor 110 can retrieve and execute programming instructions in order to configure the HVAC system controller 105 for particular HVAC equipment 140, 140A. The processor 110 can include any suitable processor, such as, but not limited to, a single processor, a single processor having multiple processing cores, multiple processors, or the like.

The memory 115 is in communication with the processor 110. The memory 115 is generally included to be representative of a random access memory such as, but not limited to, a dynamic random access memory, a static random access memory, a Flash memory, or the like. The memory 115 stores instructions for an operating system that is executed by the processor 110. The memory 115 can also store an instruction for a computer program that is executed by the processor 110. The computer program includes instructions such as, but not limited to, a dynamic calibration mode. The memory 115 stores a plurality of parameters and corresponding settings for the plurality of parameters that are, for example, based on the HVAC equipment 140, 140A. In some embodiments, the plurality of settings stored in the memory 115 includes, for example, a schedule according to which the HVAC equipment 140, 140A heats or cools the conditioned space 100. In other embodiments, the plurality of settings stored in the memory 115 can include a dynamic correction factor determined during the dynamic calibration mode. The memory 115 can also store, for example, one or more models for determining a dynamic correction factor based on an execution of the dynamic calibration mode.

The network interface 120 is configured to connect the HVAC system controller 105 to a network 145. The network 145 can be, for example, the Internet, a cellular network, a wireless network (WiFi), or the like. The network interface 120 is in communication with the network 145 via a wired connection, according to some embodiments. In other embodiments, the network interface 120 is in communication with the network 145 via a wireless communication, such as, but not limited to, WiFi, Bluetooth, ZigBee, Z-Wave, other radio frequency (RF) communication, or the like. Network interface 120 can be configured to provide operational information to a network capable of performing analytics on the operational information. In some embodiments, this can provide for additional performance tuning of the calibration algorithm.

The user interface 125 is a combination display and a human-computer interface device. The user interface 125 displays an image as instructed by the processor 110. In some embodiments, the user interface 125 can be a touchscreen. In some embodiments, the touchscreen can be a color touchscreen. In some embodiments, the user interface 125 can include a combination of user inputs such as, but not limited to, buttons and a display. In such some embodiments, the display can be a touchscreen or a display-only screen. The user interface 125 can be configured to detect a user input via touch or contact by a human finger or a device such as, but not limited to, a stylus device, or the like. The user interface 125 sends a signal indicative of the detected user input to the processor 110.

In some embodiments, the sensor 130A is a temperature sensor. For example, the HVAC system controller 105 can represent a configurable thermostat including the temperature sensor 130A. The HVAC system controller 105 may not utilize the internal temperature sensor 130A and may instead utilize any other suitable sensor, such as, but not limited to, 130B-130C that is in communication with the HVAC system controller 105 and disposed outside the HVAC system controller 105. Sensors 130B, 130C can include sensors suitable for sensing environmental conditions other than, or in addition to, temperature. For example, if HVAC system controller 105 is configured to control humidity and/or air quality, it can include the sensors 130B, 130C with a humidity sensor and/or or an air quality sensor. In some embodiments, the HVAC system controller 105 can include the sensor 130A and be in communication with the sensors 130B, 130C. In other embodiments, the HVAC system controller 105 can include one or more of the sensors 130A-130C.

The sensors 130A-130C can be located in various portions of the conditioned space 100. For example, sensor 130A can be located in conditioned space 100A, sensor 130B in conditioned space 100B, and sensor 130C in conditioned space 100C. In some embodiments, one or more of the conditioned spaces 100A-100C can have individually controlled components from the HVAC equipment 140, 140A. For example, a first controlled airflow may be provided to conditioned space 100A, a second controlled airflow may be provided to conditioned space 100B, and a third controlled airflow may be provided to conditioned space 100C. In some embodiments, one or more of the conditioned spaces 100A-100C may not have the ability to receive its own airflow. For example, conditioned space 100C may receive airflow escaping conditioned space 100A or 100B, or conditioned space 100C may receive an allocated portion of an airflow from the HVAC equipment 140, 140A.

In some embodiments, a handheld device such as, but not limited to, a cellular telephone, a tablet, a laptop computer, or the like, can be connected to the HVAC system controller 105. In such embodiments, the handheld device can be used to provide condition inputs regarding the comfort of one or more of the conditioned spaces 100A-100C. For example, an individual in conditioned space 100B can provide feedback informing the HVAC system controller 105 that a comfort level is, for example, not met.

The storage 150 can include, for example, a hard disk drive, a solid-state drive, a Flash memory storage drive, or the like. The storage 150 is in communication with the HVAC system controller 105 via the network 145. In some embodiments, the storage 150 can include one or more applications, such as, but not limited to, a storage manager that can be configured to send and receive information over the network 145 to the HVAC system controller 105. The storage 150 can represent a single storage medium or a plurality of storage media. In some embodiments, the storage 150 can be part of a cloud storage system and include, for example, virtualized storage. In some embodiments, the virtual storage can, for example, be a part of a home automation system that enables a user to remotely monitor/modify one or more settings of the HVAC system controller 105. An example of a home automation system is the Nexia™ Home Intelligence system, available from Ingersoll Rand.

The HVAC system controller 105 includes a dynamic calibration mode (discussed in additional detail in accordance with FIG. 2A below). In the dynamic calibration mode, the HVAC system controller 105 can selectively enable and disable one or more aspects of the HVAC system (e.g., one or more fans of the HVAC equipment 140, 140A) and monitor temperature at the HVAC system controller 105 and/or the sensors 130A-130C in order to calculate a dynamic correction factor for the HVAC system controller 105 and/or for each of the sensors 130A-130C. Selectively enabling and disabling the one or more aspects of the HVAC system can dynamically change an environmental condition in one or more of the conditioned spaces 100A-100C.

In some embodiments, the dynamic calibration mode can be repeated if the HVAC system is capable of operating at a plurality of speeds (e.g., one or more of the fans include variable speeds). The monitored temperatures and/or the dynamic correction factor(s) can be saved to the storage 150. Another HVAC system controller 155 can be in communication with the HVAC equipment 140A and can be part of the same HVAC system as the HVAC system controller 105, according to some embodiments. For example, the HVAC system controller 105 can control a first zone or type of HVAC equipment 140 in the conditioned space 100 and the HVAC system controller 155 can control a second zone or type of HVAC equipment 140A in the conditioned space 100. In other embodiments, the HVAC system controller 155 can be connected to HVAC equipment similar to the HVAC equipment 140, 140A but that is part of a different HVAC system. Aspects of the HVAC system controller 155 can be the same as or similar to aspects of the HVAC system controller 105.

Figure 2A:
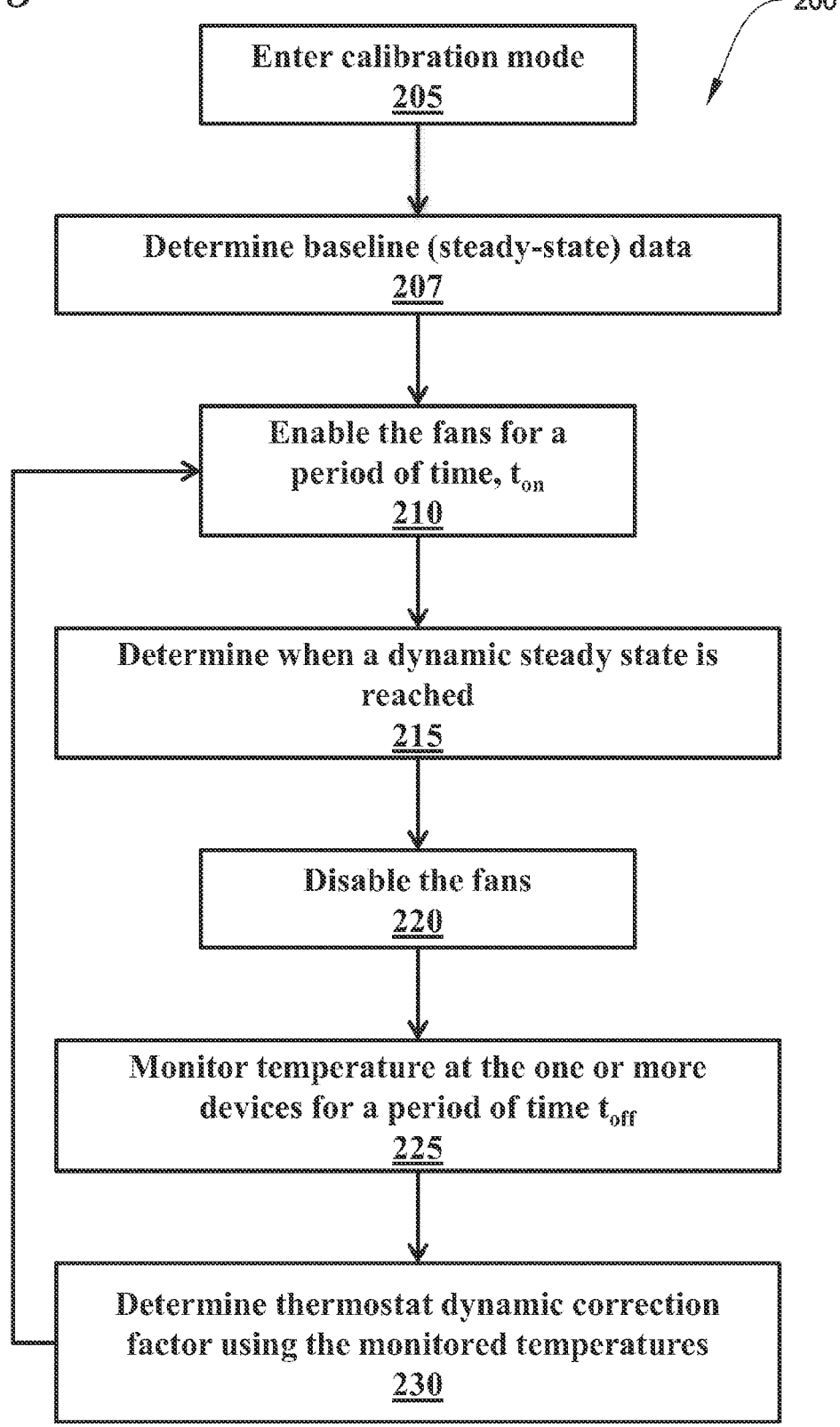
FIG. 2A illustrates a method to dynamically calibrate an HVAC system controller for a particular HVAC system and/or sensor, according to some embodiments.
Figure 2B:
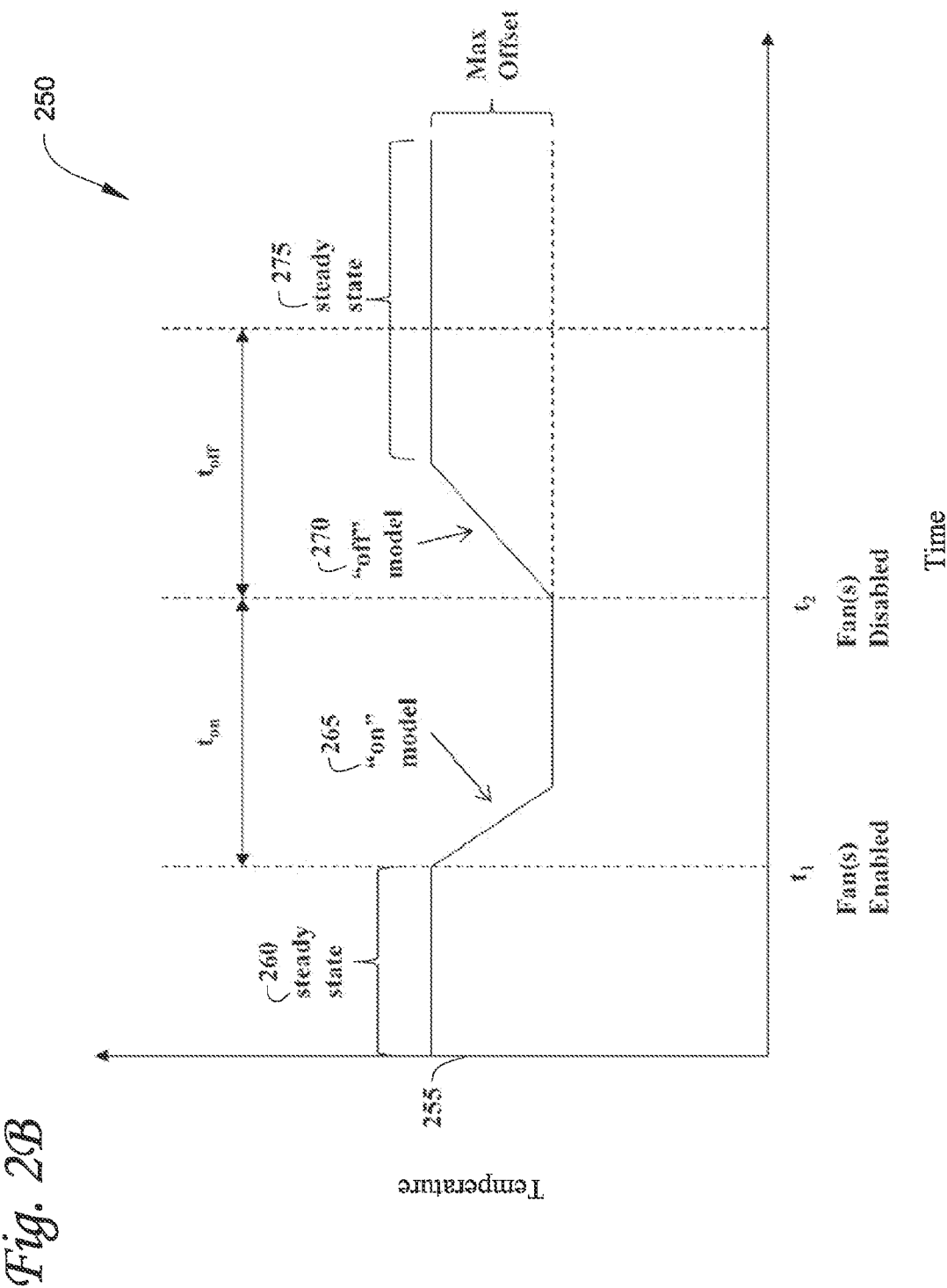
FIG. 2B illustrates a plot of temperature during a dynamic calibration mode for a conditioned space, according to some embodiments.

FIG. 2A illustrates a method 200 to dynamically calibrate an HVAC system controller (e.g., the HVAC system controller 105 of FIG. 1) for a particular HVAC system and/or sensor (e.g., the sensors 130A-130C of FIG. 1), according to some embodiments. The method 200 generally includes enabling and disabling portions of the HVAC system (e.g., one or more fans) in order to obtain temperature data from one or more sensors 130A-130C and calculate a dynamic correction factor for each of the one or more sensors 130A-130C. FIG. 2B, discussed in additional detail below, provides additional explanation of the method 200. In some embodiments, the one or more sensors include a sensor integrated with the HVAC system controller 105 (e.g., the sensor 130A of FIG. 1) and/or one or more sensors external to the HVAC system controller 105 (e.g., one or more of the sensors 130B-130C of FIG. 1).

The method 200 begins at 205 when the HVAC system controller 105 enters a dynamic calibration mode. In some embodiments, the dynamic calibration mode can be entered in response to receiving a user input on the HVAC system controller 105. For example, the dynamic calibration mode can be selected when installing the HVAC system controller 105. It is to be appreciated that the dynamic calibration mode can be entered manually at any time a user chooses. That is, the HVAC system can be operational without completing the method 200. Once selected, the HVAC system controller 105 can select a particular time to execute the calibration (e.g., nighttime, daytime, specific hours, or the like). In some embodiments, the HVAC system controller 105 can execute the dynamic calibration mode upon selection. In other embodiments, the dynamic calibration mode can be executed from an external device, such as a device connected to a network (e.g., the network 145 of FIG. 1). In some embodiments, a dealer, service technician, or the like, can start the method 200 by, for example, pushing firmware to the HVAC system controller 105. In some embodiments, the method 200 may also be triggered by a change in a heating/cooling requirement of one or more of the conditioned spaces 100A-100C (e.g., heating/cooling requirements can change based on, for example, seasonal weather changes).

In some embodiments, the HVAC system controller 105 can be configured to periodically enter the dynamic calibration mode. In some embodiments, the HVAC system controller 105 can be configured to enter the dynamic calibration mode according to a schedule or schedule-based scheme. For example, the dynamic calibration mode can be configured to execute once per month in order to optimize the HVAC system. This can, for example, modify the dynamic correction factor so that it accounts for changes that are made to a conditioned space over time (e.g., installation of new windows, addition of insulation, or the like). It is to be appreciated that once per month is exemplary and that a variety of time periods can be selected. In some embodiments, the period can be configured by a user.

Once the dynamic calibration mode is entered, at 207, the HVAC system controller 105 establishes a baseline correction factor (e.g., a steady state correction factor). In some embodiments, the method 200 may not continue until the baseline correction factor is established.

Next, at 210, the HVAC system controller enables one or more fans of the HVAC system. Generally, the HVAC system controller 105 enables all of the fans of the HVAC system at 210. In some embodiments, the HVAC system controller 105 can enable the one or more fans on a zone-by-zone basis. In some embodiments, the HVAC system controller 105 can repeat the dynamic calibration mode to include setting the one or more fans at different speeds.

In some embodiments, the HVAC system controller 105 can additionally enable a cooling mode or a heating mode of the HVAC system. In other embodiments, the HVAC system controller 105 can perform the method 200 with one or more fans enabled, perform the method 200 with the cooling mode enabled, and/or perform the method 200 with the heating mode enabled. In some embodiments, the HVAC system controller 105 can include one or more dynamic calibration conditions that prevent the HVAC system controller 105 from enabling the cooling mode and/or the heating mode. Examples of the one or more dynamic calibration conditions include, but are not limited to, preventing the heating or cooling mode depending on ambient temperature, time of year limitations, or the like.

The one or more fans can be enabled for a period of time, $t_{on}$. During the period $t_{on}$, the HVAC system controller 105 monitors temperature measurements of one or more devices being calibrated at 215. In some embodiments, the temperature measurements can be determined by the HVAC system controller 105 or sensor 130A that is part of the HVAC system controller 105. In other embodiments, the temperature measurements can be determined by one or more sensors 130B-130C disposed in another area of the conditioned space 100. For example, the HVAC system controller 105 can be located on a main floor of a house, and the sensor being configured can be located on a second floor of a house. Enabling the one or more fans creates airflow through the conditioned space and around the HVAC system controller 105 and/or sensors 130A-130C, which can result in the dissipation of the internally generated heat and/or a change in in the HVAC system controller 105 and/or the sensors 130A-130C.

In some embodiments, temperature measurements can be taken at all sensors (e.g., the sensors 130A-130C of FIG. 1) that are in communication with the HVAC system controller 105 during the dynamic calibration mode. This can, for example, allow for all sensors 130A-130C to be calibrated during a single execution of the dynamic calibration mode.

In some embodiments, the time period $t_{on}$ can be a default value that is capable of being overridden by a user. In other embodiments, the time period $t_{on}$ can be set based on an amount of time for the HVAC system to settle to a new steady state condition. That is, the time period $t_{on}$ may be dynamically determined based on the temperature measurements. Once the temperature measurements are no longer changing, the HVAC system controller 105 can disable the one or more fans, ending the time period $t_{on}$.

Once the time period $t_{on}$ is complete, the HVAC system controller 105 disables the one or more fans at 220. The HVAC system controller 105 monitors temperature measurements for a period of time $t_{off}$ with the fans disabled at 225. The temperature measurements at 225 are determined from the same sensor(s) 130A-130C as in 215.

In some embodiments, the time period $t_{off}$ can be a default value that is capable of being overridden by a user. In other embodiments, the time period $t_{off}$ can be set based on an amount of time for the HVAC system to settle to a new steady state condition. That is, the time period $t_{off}$ may be dynamically determined based on the temperature measurements. Once the temperature measurements are no longer changing, the HVAC system controller 105 can resume normal operation, thereby ending the time period $t_{off}$. In some embodiments, since the dynamic calibration mode circulates airflow through the conditioned spaces 100A-100C without heating/cooling the airflow, the temperature measurements at about the beginning of the dynamic calibration mode can be the same as or similar to the temperature measurements at about the end of the dynamic calibration mode.

At 230, the HVAC system controller 105 uses the temperature measurements taken during the time period $t_{on}$ and the time period $t_{off}$ to determine a dynamic correction factor for each of the sensors 130A-130C being calibrated. A curve-fitting algorithm, such as, but not limited to, a linear algorithm, an exponential algorithm, or the like, can be used to calculate a dynamic correction factor that fits the temperature measurements taken during $t_{on}$ and $t_{off}$. The resulting dynamic correction factor can accordingly be time dependent. For example, the dynamic correction factor may be a first value at about the time the one or more fans are enabled and a second value at about the time the one or more fans are disabled.

In some embodiments, if the baseline correction factor determined after $t_{off}$ is different than the baseline correction factor determined prior to $t_{on}$, the HVAC system controller 105 may restart the method 200. This can, for example, be an indication that the HVAC system was not at the steady state prior to beginning the dynamic calibration mode.

FIG. 2B illustrates a plot 250 of temperature during a dynamic calibration mode for a conditioned space, according to some embodiments. The plot 250 generally illustrates an exemplary curve obtained from the method 200 described above.

The line 255 generally indicates temperature measured over time. The dynamic correction factor for each interval can vary according to HVAC system operation. During a steady state period 260 (e.g., a period in which the HVAC system is not operating) a baseline correction factor based on an amount of heat generated by a space surrounding a sensor (e.g., the sensors 130A-130C of FIG. 1) at which the temperature measurements are taking place can be determined. For example, the value for the steady state period 260 may be determined by simulation testing and specific to a sensor type. That is, if the HVAC system controller 105 includes a color display it may have a steady state correction value in the steady state period 260 and if the HVAC system controller 105 includes a black and white display, it may have a second steady state correction value in the steady state period 260.

If a user selects to run a dynamic calibration mode (e.g., as described in accordance with FIG. 2A above), at time $t_1$ one or more fans can be enabled. The one or more fans can run for a period $t_{on}$, and be disabled at time $t_2$. During the period $t_{on}$ the one or more sensors 130A-130C being calibrated can monitor a temperature in the conditioned space 100. It is important to note that during the dynamic calibration mode the actual temperature of the conditioned space 100 does not change. The temperature measurements taken by the one or more sensors 130A-130C reflect the temperature of an area of the conditioned space 100 proximate each of the sensors 130A-130C. During the dynamic calibration mode, the HVAC system is cycling airflow. The measured temperature changes are a result of circulating airflow around the one or more sensors 130A-130C, which distributes the heat maintained in the space surrounding the sensors 130A-130C.

In steady state 260, a measured temperature is about the same as the temperature of the conditioned spaces 100A-100C plus an increase in temperature due to heat generated by one or more internal components of a device (e.g., heat generated by the sensors 130A-130C or the electronics of the HVAC system controller 105). During the period $t_{on}$, airflow around the sensors 130A-130C can dissipate at least a portion of the internally generated heat, which can, in some embodiments, dynamically reduce the measured temperature of the sensors 130A-130C. The temperature measurements during period $t_{on}$ can settle to a $t_{on}$ steady state temperature 265A that reflects that the airflow can cause a larger portion of the internally generated heat to be dissipated than during the steady state 260.

Generally, the measured temperature will decrease and settle at a max offset. The decreasing portion represents the "on" model 265, and a curve-fitting algorithm can be used to determine a dynamic correction factor that is used to correct temperature when the one or more fans are enabled.

During the period $t_{off}$ the sensor monitors the temperature in the conditioned space 100. The temperature will increase back to the steady state period 275. It is important to note that during the $t_{off}$ time, the actual temperature of the conditioned space 100 does not change. The measured temperature change is a result of the removal of circulating airflow, which allows heat to build in the space surrounding the sensors 130A-130C. The increasing portion represents the "off" model 270, and a curve-fitting algorithm can be used to determine a dynamic correction factor. As such, the nature of the dynamic calibration can compensate for airflows that remove the internally generated heat of the HVAC system controller 105.

In some embodiments, there can be a single dynamic correction factor that applies when the HVAC system is disabled (e.g., as determined from data during $t_{off}$) and enabled (e.g., as determined from data during $t_{on}$). For example, the dynamic correction factor can be based on the temperature measurements taken during the dynamic calibration mode such that, for example, the dynamic correction factor is somewhere between the fan enabled baseline and the fan disabled baseline. In other embodiments, there can be more than one dynamic correction factor that is applied depending on whether the one or more fans are enabled. That is, there can be a system enabled dynamic correction factor (e.g., as determined from data during $t_{on}$) and a system disabled dynamic correction factor (e.g., as determined from data during $t_{off}$).

In some embodiments, the HVAC system controller 105 can identify sensors providing anomalous readings. Examples of monitoring conditions that can affect a sensor include, but are not limited to, direct sunlight on the sensor or an area surrounding the sensor, heat received from a nearby water heater or other appliances, electronics, or the like. In some embodiments, these sensors can be disabled during certain times of the day (e.g., daytime hours) based on the determination. In some embodiments, a dynamic correction factor may not be determined at 230. For example, if a sensor is placed near a doorway, airflow may be turbulent and cause randomness in the temperature measurements. In such a scenario, the HVAC system controller 105 can indicate an issue in the calibration and provide, for example, a recommended solution (e.g., move the sensor, try again, or the like) to a user. Examples of causes for poor temperature measurements include, but are not limited to, sunlight heating a surface resulting in higher than actual temperatures; a position of the sensor with respect to an air vent; a secondary heat source such as, but not limited to, a fireplace or a heating appliance; or the like.

In some embodiments, the HVAC system controller 105 can provide one or more offsets so that the sensors are calibrated in comparison to each other. In other embodiments, the HVAC system controller 105 can select a best sensor that is, for example, least affected by airflow in the conditioned space 100 (e.g., temperature measurements indicate the least fluctuation, or the like).

The dynamic correction factor can also be stored in a memory (e.g., the memory 115 of FIG. 1) of the HVAC system controller 105 at 230. The stored dynamic correction factor can be used by the HVAC system controller 105 to control the temperature of the conditioned space 100. That is, the HVAC system controller 105 can use the stored dynamic correction factors to correct temperature measurements taken by the HVAC system controller 105 and/or the sensors 130A-130C. A process of using the stored dynamic correction factors to correct temperature measurements is discussed in additional detail in accordance with FIG. 2C below.

In some embodiments, a dynamic correction factor can be determined during one or more times of a day when temperatures in the conditioned space 100 is rapidly changing, for example, because of natural effects (e.g., sunrise or sunset). In such embodiments, the dynamic correction factor can be determined by a curve-fitting method between a temperature before the dynamic calibration period and a temperature following the dynamic calibration period, and then removing that period from the dynamic correction factors.

The method 200 can be executed for any temperature sensor in communication with the HVAC system controller 105. This can, for example, allow for temperature control from the various sensors. The HVAC system controller 105 can be configured with one or more sensor conditions to determine which of the various sensors is used to provide temperature measurements to the HVAC system controller 105. For example, a sensor in a bedroom can be used for temperature measurements and HVAC system control during nighttime and a sensor in a television room can be used for temperature measurements and HVAC system control during daytime and/or evening time. Similarly, a house can be warmed on an east-facing side as the sun rises and warmed on its west-facing side as the sunsets. This can affect the heating and/or cooling of the house on the opposite facing side, which can cause occupant discomfort. In such embodiments, the HVAC system controller 105 can be configured to select appropriate sensors to minimize occupant discomfort during such periods.

FIG. 2C illustrates a method 290 to dynamically correct a temperature measurement using an HVAC system controller (e.g., the HVAC system controller 105 of FIG. 1) for a particular HVAC system and/or sensor (e.g., the sensors 130A-130C of FIG. 1), according to some embodiments.

The method 290 begins at 291, when a temperature measurement is determined by the HVAC system controller 105. The temperature measurement can, for example, be determined from the one or more sensors 130A-130C. At 292, the HVAC system controller 105 determines a dynamic correction factor for the temperature measurement. The dynamic correction factor determined at 292 is dependent upon one or more dynamic parameters and by the various information determined from the HVAC system controller 105 identifying a state (e.g., on, off, heating mode, cooling mode, fans only, or the like) of the HVAC system. For example, the HVAC system can be in an off state during a particular time of the day. The HVAC system controller 105 can use the various state and dynamic parameter information to identify the dynamic correction factor to be used. In some embodiments, if the HVAC system controller 105 has not executed the dynamic calibration mode (e.g., the method 200 of FIG. 2A), the dynamic correction factor can be a static correction factor for the device (e.g., preconfigured for the particular device). In some embodiments, if the HVAC system controller 105 has been executed in the dynamic calibration mode, the correction factor determined at 292 can be based on the results of the dynamic calibration mode and the current state of the HVAC system and one or more dynamic parameters. For example, if the HVAC system is disabled, the HVAC system controller 105 can determine the dynamic correction factor from the amount of time the HVAC system has been disabled and the off model (e.g., the "off" model 270 of FIG. 2B).

At 293, the HVAC system controller 105 modifies the temperature measurement from 291 using the dynamic temperature correction factor as determined at 292. At 294, the HVAC system controller 105 uses the modified measurement from 293. The method 290 can accordingly account for the variety of dynamic parameters that may affect temperature measurements taken by the HVAC system controller 105.

Figure 3:
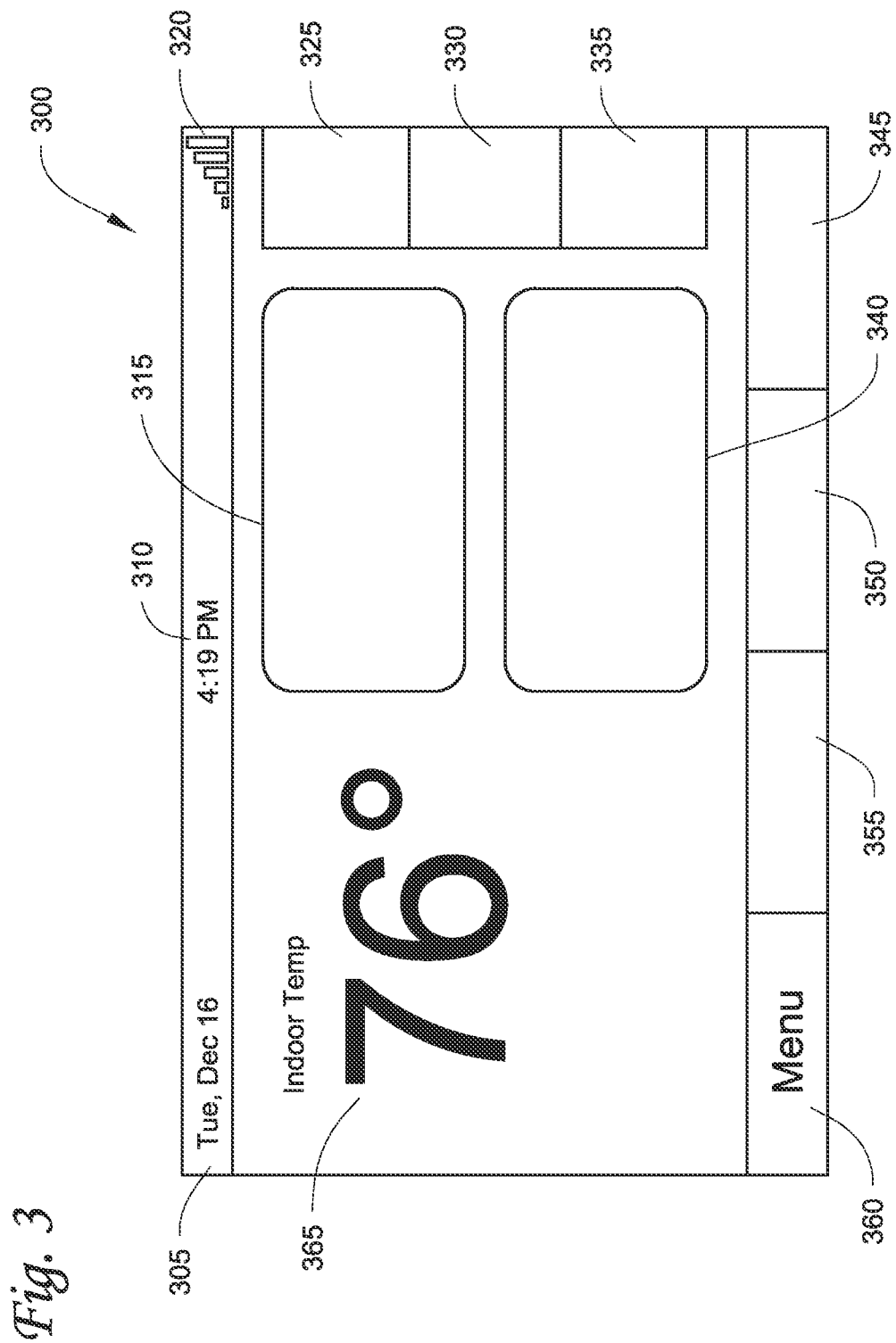
FIGS. 3-5 illustrate a user interface for an HVAC system controller, according to some embodiments.
Figure 4:
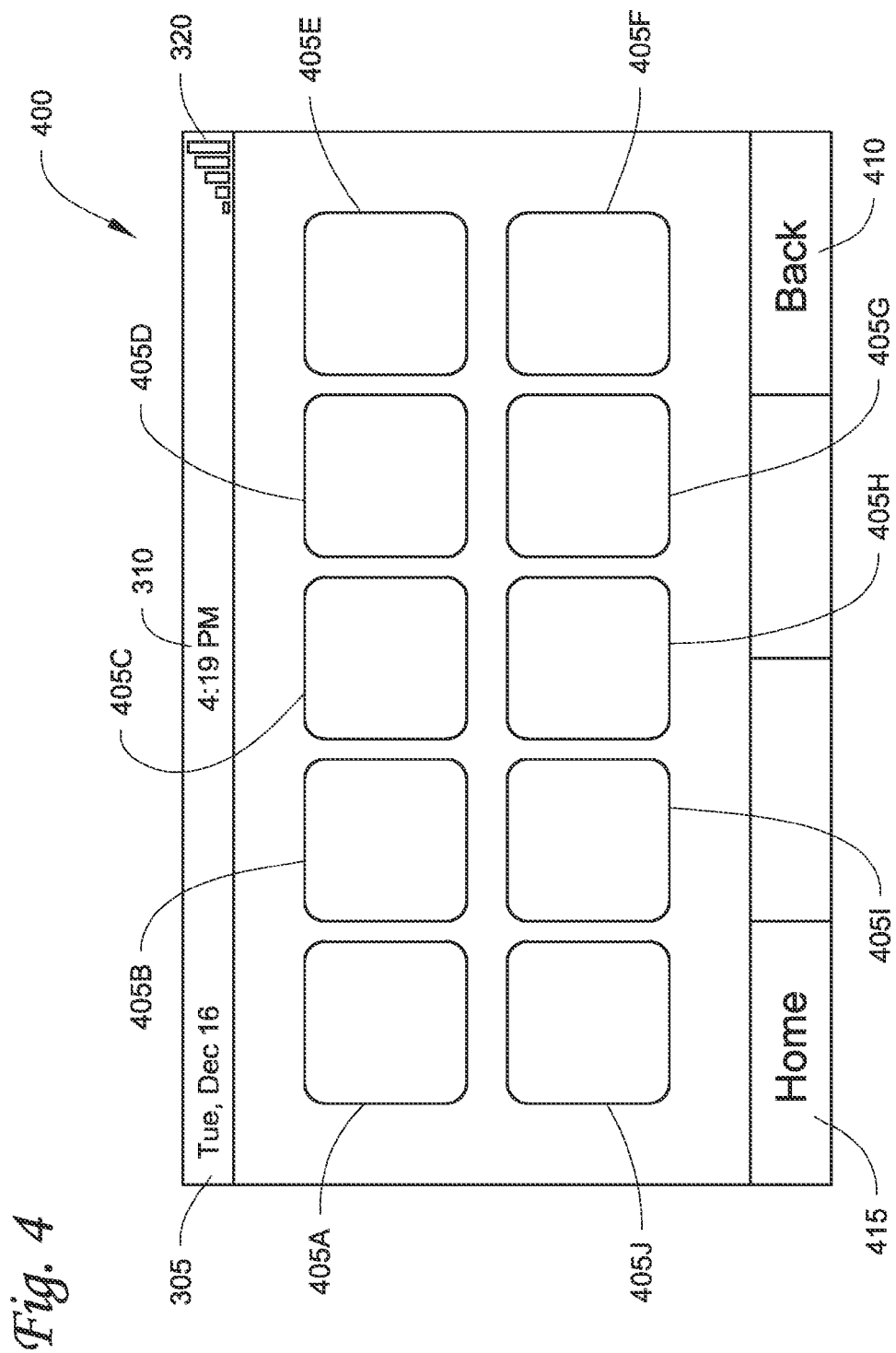
Figure 5:
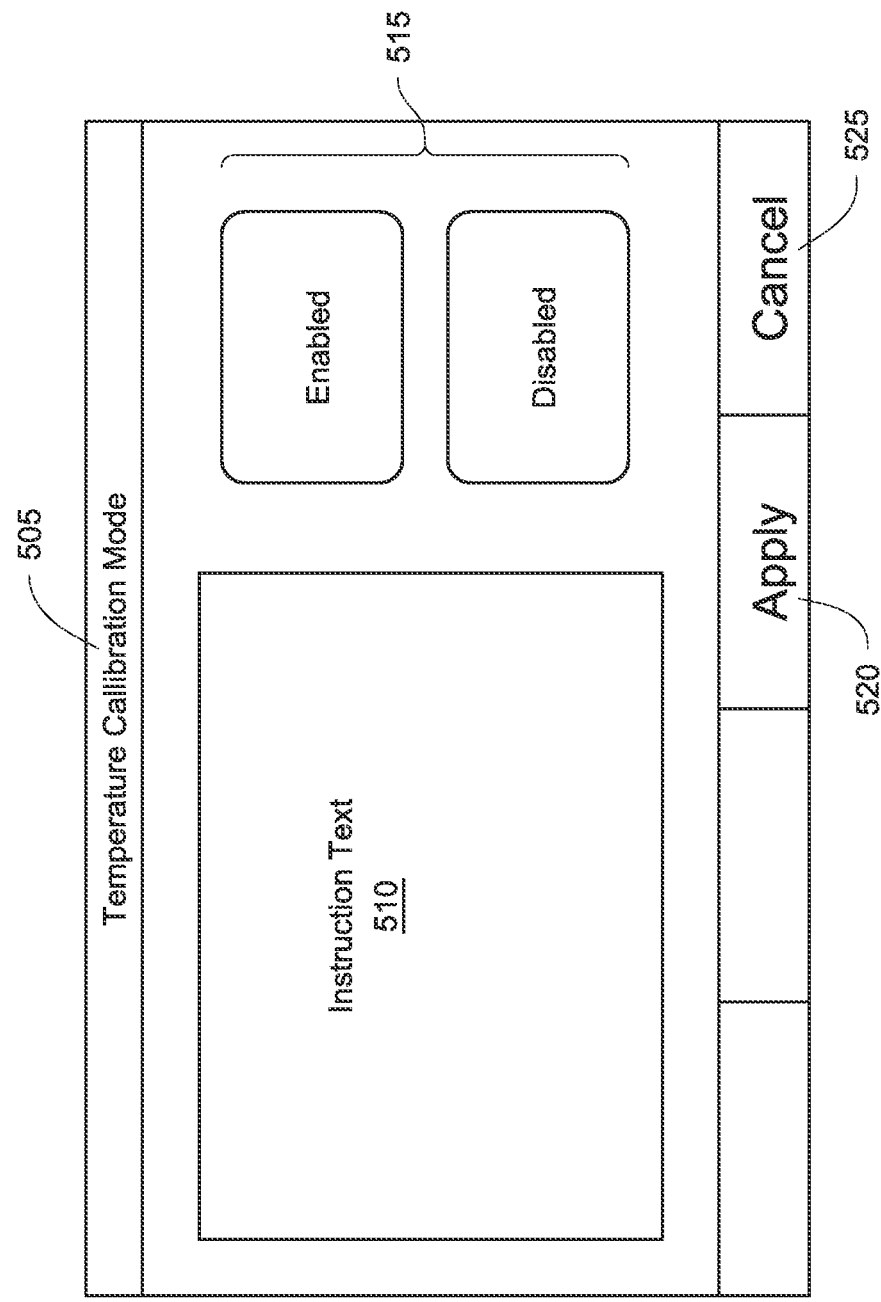

FIGS. 3-5 are illustrations of a user interface (e.g., the user interface 125 of FIG. 1) for an HVAC system controller (e.g., the HVAC system controller 105 of FIG. 1), according to some embodiments. The illustrations include text and buttons according to some embodiments. It is to be appreciated that the screens can be modified without departing from the scope of this disclosure. For example, a "Menu" button (e.g., "Menu" button 360) can include a symbol such as, but not limited to, an alternative image, alternative text, or the like. It is to be appreciated that a "button," as used herein, does not require a button, but can include an area of a touchscreen that a user can press and function similar to a button.

FIG. 3 illustrates the user interface 125 when displaying a home screen 300, according to some embodiments. The home screen 300 can include a date 305 and a time 310. The time 310 can be replaced by a notification or system alert when present. In some embodiments, the notification or system alert can be added without replacing the time 310. The outdoor weather conditions are displayed at 315. In some embodiments, if a user selects the weather 315, the user interface 125 can display an extended forecast, radar display, and/or alerts or the like. The network status 320 indicates whether the HVAC system controller 105 is connected to a network and corresponding signal strength of the connection. A one-touch energy savings mode 325 allows a user to define an energy savings mode. A temperature setting 330 displays current heating and cooling set points. A status button 335 can be pressed to display a status of the HVAC system. A humidity target 340 displays a humidity set point. An air cleaner button 345 can be pressed to modify air filtration options. A fan mode button 350 can be pressed to determine a fan mode (e.g., automatic, on, circulate, or the like). A system mode button 355 can be pressed to select the operating mode of the HVAC system (e.g., automatic, heating, cooling, off, emergency heat, or the like). A menu button 360 can be pressed to show additional menu or configuration screens. A temperature control panel 365 shows the current inside temperature and can be pressed to, for example, open a temperature control panel. It is to be appreciated that the user interface 125 is exemplary and can include fewer or additional features, according to some embodiments.

FIG. 4 illustrates the user interface 125 when displaying a settings screen 400, according to some embodiments. Aspects of the settings screen 400 can be the same as or similar to aspects of the home screen 300.

The settings screen 400 includes the date 305 and time 310 along with the network status 320. The settings screen 400 includes a plurality of buttons 405A-405J to display various settings options. For example, thermostat button 405A, when selected, allows a user to set a temperature scale, outdoor temperature sensor source, or the like. In some embodiments, the thermostat button 405A allows a user to enter the dynamic calibration mode described in accordance with FIGS. 2A-2B above. Schedule button 405B allows a user to enable and/or disable thermostat scheduling. The settings screen 400 also includes a Back button 410 which allows a user to move back a screen and a Home button 415 which allows a user to return to the home screen 300.

FIG. 5 illustrates the user interface 125 when displaying a temperature calibration screen 500, according to some embodiments. Aspects of the temperature calibration screen 500 can be the same as or similar to aspects of the home screen 300 and/or the settings screen 400.

The temperature calibration screen 500 includes a title 505. An instruction text 510 is included indicating expected HVAC operations during execution of the dynamic calibration mode. A selection section 515 allows a user to decide whether they would like to enter the dynamic calibration mode. Buttons 520 and 525, respectively, allow a user to apply his decision or cancel out of the dynamic calibration mode. When a user indicates in the selection section 515 that he would like to enable the dynamic calibration mode and selects button 520, the dynamic calibration mode will be executed. If the user selects the button 525 or indicates in the selection section 515 that he would like to disable the dynamic calibration mode and selects the button 520, the user may be returned to the previous screen (e.g., the settings screen 400). In some embodiments, the buttons 520 and 525 are not required and the user can enable or disable the dynamic calibration mode by his indication in the selection section 515.

FIG. 6 illustrates a plot 600 of temperature over time for a conditioned space, according to some embodiments. Line 605 indicates a temperature of the conditioned space and line 610 indicates an outdoor temperature over time. Columns 615 indicate periods in which an HVAC system is in a heating mode and with fans enabled to supply thermal energy to the conditioned space. Accordingly, line 605 generally indicates a temperature rise during and after the heating mode is enabled. During a period in which the heating mode is disabled, the line 605 generally indicates that the temperature of the conditioned space at times moves toward the outdoor temperature. Generally, when the heating is disabled, the rate of change of the temperature of the conditioned space can be dependent upon a loss of thermal energy within the conditioned space to the outside environment.

The thermal energy contained within the conditioned space includes the thermal energy of the air and the thermal energy contained by the mass of the conditioned space (e.g., the walls, surfaces, or the like). Generally, when the HVAC system is heating, the thermal mass of the conditioned space can absorb thermal energy from the heated air. When the HVAC system is cooling, the thermal mass of the conditioned space can dissipate thermal energy to the air. Accordingly, the temperature of the thermal mass of the of the conditioned space is generally lower than the air temperature when heating and higher than the air temperature when cooling.

The thermal mass of the conditioned space is indicative of the ability of the conditioned space to store thermal energy. A variety of factors can influence the thermal mass of the conditioned space. Examples of factors influencing the thermal mass include, but are not limited to, construction materials, insulation, size and/or location of ductwork, secondary heat sources (e.g., sunlight), or the like.

The thermal mass of the conditioned space can account for a perception of an occupant that a house has a "chill" or that it takes a long time for a house to "heat up" or "cool down." While the HVAC system may be able to quickly heat/cool air within a conditioned space, the thermal mass of the conditioned space (e.g., the contents of the conditioned space) take much longer to heat and/or cool.

In some embodiments, the dynamic correction factor can be based, for example, on the thermal mass of the conditioned space. The thermal mass of the conditioned space may vary by area within the conditioned space (e.g., based on materials in the space such as, but not limited to, carpet or tile; insulation within the space; or the like) and can generally vary from conditioned space to conditioned space. Accordingly, in some embodiments, the dynamic calibration mode can determine the dynamic correction factor dependent on one or more parameters of the conditioned space.

Figure 7A:
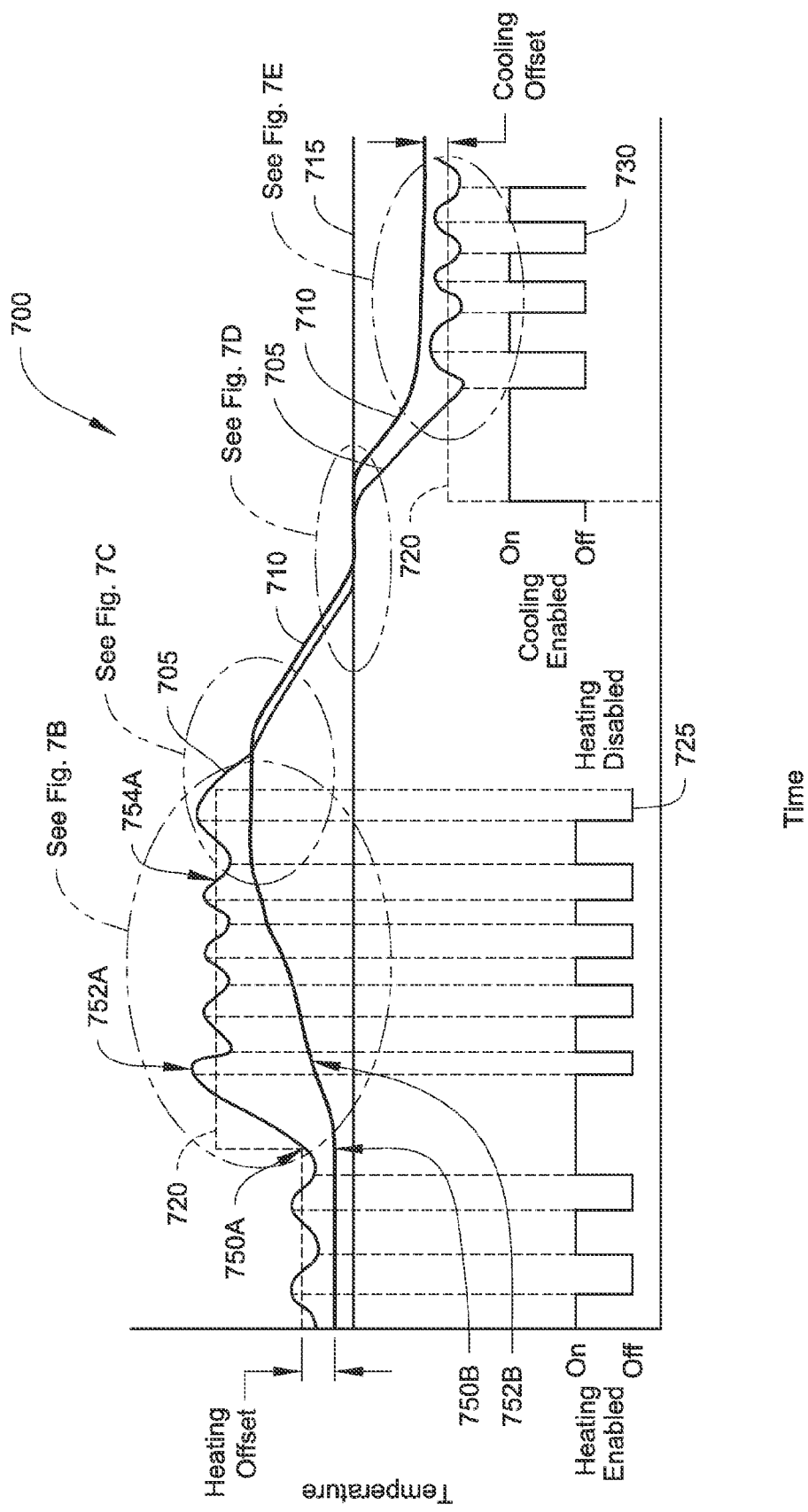
FIG. 7A illustrates a plot of temperature over time and its correlation with thermal mass of a conditioned space, according to some embodiments.

FIG. 7A illustrates a plot 700 of temperature over time and its correlation with thermal mass of a conditioned space, according to some embodiments. The time scale of plot 700 has been compressed to illustrate the cyclic nature of heating/cooling a conditioned space. Line 705 represents an inside air temperature of the conditioned space over time. Line 710 represents a thermal core temperature of the conditioned space over time. Line 715 represents a relatively constant outdoor temperature (e.g., ambient temperature) over time. Dashed line 720 represents a set point temperature for the conditioned space over time. Line 725 represents when a heating mode (e.g., supplying thermal energy) of an HVAC system for the conditioned space is cycled on/off. Line 730 represents when a cooling mode (e.g., removing thermal energy) of the HVAC system for the conditioned space is cycled on/off.

The plot 700 generally illustrates how thermal mass of the conditioned space relates to temperature control of the conditioned space. For example, when the HVAC system is operating to reach its set point temperature (in either heating or cooling mode), the inside air temperature reaches the set point quicker than the thermal core temperature. For example, at point 750A the heating mode is enabled and the inside air temperature rises to point 752A. The thermal core temperature, however, only rises from 750B to 752B. Generally, the changing inside air temperature is what an occupant in the conditioned space notices. When the thermal core temperature and the inside air temperature are farther apart, the occupant may notice rapid changes in temperature due to the cycling of the HVAC system more than when the inside air temperature and the thermal core temperature are closer together. From 752A to 754A, the inside air temperature fluctuates around the set point temperature depending on whether the HVAC system is enabled or disabled while the thermal core temperature is pulled toward the set point temperature. As the control algorithm is modified based on overshoot of the set point temperature, the inside air temperature turns to a more sinusoidal wave as the thermal core temperature approaches the inside air temperature.

At 752A, after the heating mode is disabled, the thermal mass can absorb thermal energy from the inside air, which can result in a rapid decline of the inside air temperature. The inside air temperature may drop rapidly because of a difference between the temperature of the inside air and the thermal core temperature. The rate of change of the inside air temperature can be used to predict a difference between the inside air temperature and the thermal core temperature (e.g., a heating offset, and/or a cooling offset). The heating offset and the cooling offset can be used to dynamically adjust one or more dynamic calibration factors described in the embodiments herein. Occupants often associate discomfort with rapid changes in temperature. Accordingly, a rapid decline in temperature from a large heating offset or a large cooling offset (e.g., the difference between the inside air temperature and the thermal core temperature) can cause occupant discomfort.

The rate of change of the thermal core temperature can depend on the thermal mass of the structure of the conditioned space and the rate of heat loss to the outdoor air. For example, a home or other building constructed with stone and tile will have a larger thermal mass than a home or other building constructed with wood and carpet. A building with a large thermal mass will generally take longer for the heating offset and/or the cooling offset to be reduced to levels that provide occupant comfort.

The thermal core temperature generally levels out, and may generally be different than the set point. This difference can be used to indicate inefficiencies in the conditioned space and/or the rate of heat loss to outside (e.g., ambient). Examples of inefficiencies in the conditioned space include, but are not limited to, limited insulation; loss of thermal energy through windows, doors, or the like; construction materials; secondary heat sources; or the like. This difference, however, can be an indication that another type of heating, for example radiant heating, which will affect the thermal core temperature, may be beneficial.

Once the heating mode is disabled, the inside air temperature and the thermal core temperature begin settling toward the outdoor temperature. The inside air temperature settles toward the thermal core temperature first. When the inside air temperature is greater than the thermal core temperature, the inside air will be giving heat to the thermal mass and losing heat to the outside. Once the inside air temperature is less than the thermal core temperature, the thermal mass will lose heat to the inside air and the inside air and thermal mass will both continue to lose heat to the outside. Over time, the inside air temperature and the thermal core temperature will settle toward the outdoor temperature. The point at which the inside air temperature and the thermal core temperature cross can, in some embodiments, be used to estimate the thermal core temperature. Alternatively, in some embodiments, the amount of energy supplied by the HVAC system and the change in inside air temperature may be used to estimate the thermal core temperature of the conditioned space.

FIG. 7A represents a single sensor, and similar measurements can be taken for one or more additional sensors in the conditioned space. The various measurements can then be used to identify areas in the house that may need additional heating/cooling, or alternatively, may need less heating/cooling.

FIGS. 7B-7E illustrate detailed views of portions of FIG. 7A.

Figure 7B:
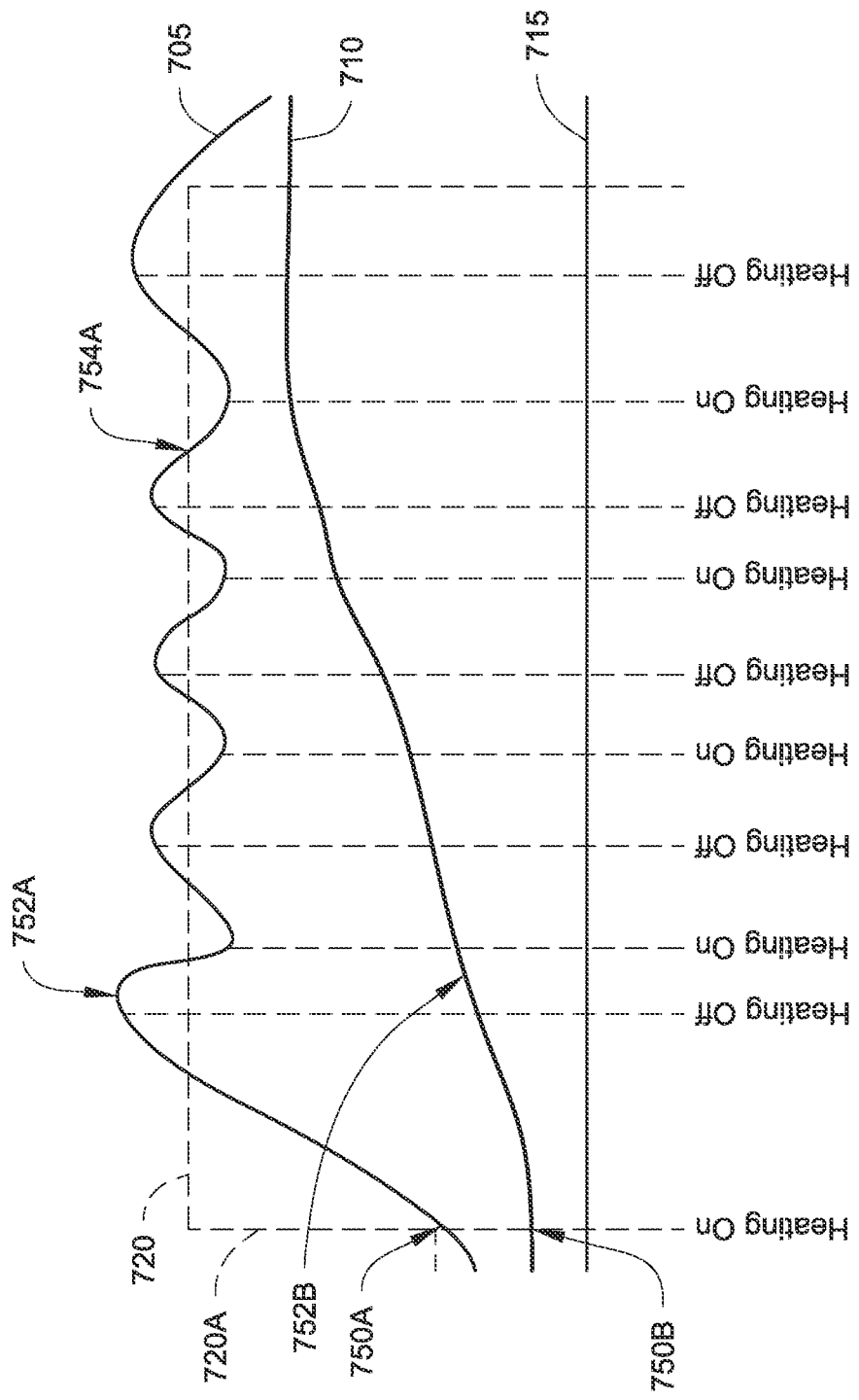

FIG. 7B illustrates a portion of plot 700 when a step-change increase 720A is made to the set point temperature 720 of the conditioned space. A portion of line 705 (representing an inside air temperature of the conditioned space over time) and line 710 (representing a thermal core temperature of the conditioned space over time) are shown. During the illustrated time period, the status of the HVAC system is represented as "Heating On" or "Heating Off."

The step-change increase 720A in the set point temperature 720 enables the HVAC system to heat the inside air temperature 705 to the new set point temperature. The inside air temperature 705 can rise rapidly as compared to the rate of change of the thermal core temperature 710. As discussed above, inside air temperature rises to 752A, but the thermal core temperature may rise to 752B, which is lower than 752A. The inside air temperature can reach the new set point temperature 720, and the heating can be disabled, at which point the inside air temperature 705 can rapidly decline as the thermal energy in the air is absorbed by the thermal mass of the conditioned space. The rapid decline in the inside air temperature 705 after point 752A can indicate that thermal energy is being absorbed by the thermal mass (e.g., lost) from the inside air.

Performing a step-change increase 720A in the set point temperature 720, as illustrated in FIGS. 7A-7B, or performing a step-change decrease 720B in the set point temperature, as illustrated in FIGS. 7A and 7E, under some circumstances, can demonstrate one or more dynamic properties of the conditioned space. The rate of change of temperature after the step-change increase/decrease 720A, 720B in set point temperature can demonstrate the ability of the HVAC system to affect the inside air temperature of the conditioned space. The rate of change of the inside air temperature after the set point temperature 720 is achieved and the HVAC system is disabled can demonstrate the rate at which thermal energy is transferred from the inside air of the conditioned space to the thermal mass of the conditioned space. The dynamic properties, like the dynamic properties related to internal airflow, can be utilized to generate a dynamic correction factor related to step-change increases 720A and/or step-change decreases 720B in the set point temperature.

Figure 7C:
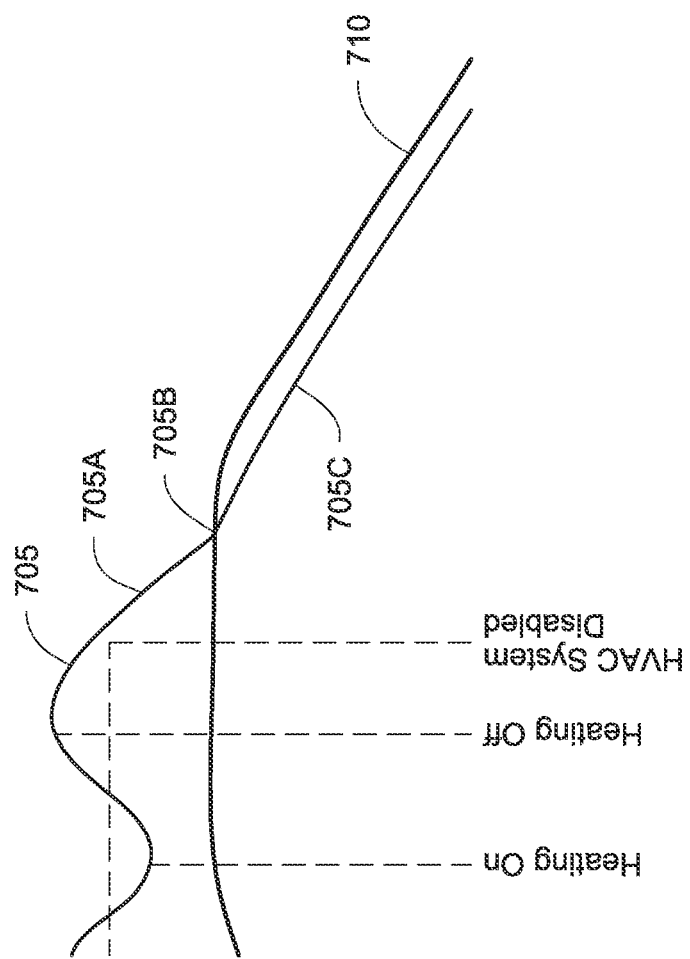

Referring to FIG. 7C, a portion of line 705 (representing an inside air temperature of the conditioned space over time) and line 710 (representing a thermal core temperature of the conditioned space over time) are shown. During the illustrated time period, heating and cooling by the HVAC system are disabled. During the period illustrated in FIG. 7C, the inside air temperature 705 is represented by three time periods. Time period 705A represents a period of time when the inside air temperature 705 is greater than the thermal core temperature 710 of the conditioned space. Time period 705C represents a period of time when the inside air temperature 705 is less than the thermal core temperature 710 of the conditioned space. Time period 705B is the time period when the inside air temperature 705 and the thermal core temperature 710 intersect. During the period 705A, thermal energy is generally being lost to the outdoor air due to, for example, imperfect insulation.

During period 705A, the inside air is cooled by the thermal core and cooled by the thermal energy lost to the outdoor air therefore the rate of change of temperature is dependent on thermal losses to the thermal core and outside air. At time period 705b, lines 705 and 710 intersect when the inside air temperature 705 and the temperature of the thermal core 710 are equal. At time period 705B, a change in the cooling rate occurs since the inside air is only cooled by the thermal energy lost to the outdoor air. During period 705C, the inside air is cooled by the thermal energy lost to the outside air and heated by thermal energy released by the thermal core.

In some embodiments, this change in the cooling rate of the inside temperature between period 705A and period 705C can be used to predict the thermal core temperature at period 705B. The difference between the predicted thermal core temperature and the previously entered set point temperature 720 provides an estimation of the heating offset of the conditioned space. The heating offset is a dynamic parameter related to the ability of the HVAC system to heat not just the inside air, but also the ability of the HVAC system to heat the thermal core of the conditioned space.

The HVAC system controller may select and execute a thermal core control algorithm to reduce and/or minimize the heating offset. The thermal core control algorithm may direct thermal energy to directly or indirectly heat one or more portions of the thermal core by, for example, enabling/disabling radiant heat or the like.

Referring to FIG. 7D, a portion of line 705 (representing an inside air temperature of the conditioned space over time) and line 710 (representing a thermal core temperature of the conditioned space over time) are shown. The inside air and the thermal core continue to cool over time until the thermal core temperature 710 and the inside air temperature 705 settle at about the outdoor air temperature (e.g., line 715 of FIG. 7). In some embodiments, the process of settling to the outdoor air temperature 715 within a cooled conditioned space functions about the same as or similar to the representation for settling to the outdoor air temperature following the heating mode.

To further illustrate dynamic calibration of an HVAC system, the cooling functionality of the HVAC system is enabled and the cooling set point is adjusted to a set point below the outside temperature of the conditioned space. As the HVAC system cools the inside air temperature, the temperature of the conditioned space drops below the outdoor air temperature 715, as illustrated in period 705d. The temperature of the thermal core lags behind the inside air temperature 715 as the thermal core is cooled by exchanging thermal energy to the inside air of the conditioned space.

Referencing to FIG. 7D, the step-change decrease 720B in the set point temperature 720 enables the HVAC system which, in turn, cools the inside air temperature 705 to the new set point. Referencing to FIG. 7E, the inside air temperature cools rapidly as compared to the rate of change of the thermal core temperature 710. When the inside air temperature 705 reaches the new set point temperature 720, cooling is disabled and the inside air temperature 705 quickly rises as the thermal core gives thermal energy to the inside air in the conditioned space. The rapid change of inside air temperature 705 after point 753A indicates that thermal energy is being absorbed (e.g., lost from the air) by the thermal core.

Performing a step-change decrease 720B the set point temperature 720, as illustrated in FIGS. 7A and 7D-7E, under controlled circumstances, demonstrates one or more dynamic properties of the conditioned space. The rate of change of temperature after the step-change decrease 720B in set point temperature 720 demonstrates the ability of the HVAC system to affect the inside air temperature of the conditioned space. The rate of change of inside air temperature after the set point temperature 720 is achieved and the HVAC system is turned off demonstrates the rate at which thermal energy is transferred from the inside air of the conditioned space to the thermal mass of the conditioned space. The dynamic properties, like the dynamic properties related to internal airflows, may be utilized to generate a dynamic correction factor related to a step-change increase 720A and/or a step-change decrease 720B in the set point temperature.

One or more of the dynamic properties described in the embodiments herein may be utilized in an HVAC system control algorithm to heat or cool the conditioned space. A dynamic parameter of the conditioned space may be utilized to calibrate a measured value, such as, but not limited to, air temperature, humidity or any other suitable measured value. A dynamic parameter of the conditioned space may be utilized to adjust the set point of the conditioned space. The adjustment may be a permanent adjustment or a temporary adjustment to the set point. For example, the temperature set point may be temporarily adjusted upward or downward when the heating or cooling offset exceeds a predetermined value.

ASPECTS

It is noted that any of aspects 1-16 below can be combined with each other in any combination and combined with any of aspects 17-24, 25-27, 28-32, or any of aspects 33-40. Any of aspects 17-24, 25-27, 28-32, or 33-40 can be combined with each other in any combination.

Aspect 1. A tangible computer accessible storage medium storing program instructions executable by a computer to execute a method for configuring a temperature control system of a heating, ventilation, and air conditioning (HVAC) system controller, the method comprising:
 enabling one or more fans in an HVAC system for a fan-enabled time period;
 monitoring temperature of a conditioned space determined by a sensor in the HVAC system during the fan-enabled time period;
 disabling the one or more fans in the HVAC system for a fan-disabled time period;
 monitoring temperature of the conditioned space by the sensor in the HVAC system during the fan-disabled time period; and
 determining, by the HVAC system controller, a dynamic correction factor based on the temperatures monitored during the fan-enabled and fan-disabled time periods.

Aspect 2. The method according to aspect 1, further comprising:
 enabling a cooling mode of the HVAC system during the fan-enabled time period.

Aspect 3. The method according to any of aspects 1-2, further comprising:
 enabling a heating mode of the HVAC system during the fan-enabled time period.

Aspect 4. The method according to any of aspects 1-3, further comprising enabling all of the one or more fans in the HVAC system.

Aspect 5. The method according to any of aspects 1-4, further comprising enabling one or more ceiling fans.

Aspect 6. The method according to any of aspects 1-5, further comprising one or more secondary heat sources.

Aspect 7. The method according to any of aspects 1-6, further comprising monitoring one or more aspects of the conditioned space.

Aspect 8. The method according to any of aspects 1-7, further comprising monitoring one or more peripheral devices.

Aspect 9. The method according to any of aspects 1-8, wherein the sensor is external to the HVAC system controller.

Aspect 10. The method according to any of aspects 1-9, wherein determining the dynamic correction factor comprises:
 calculating a curve-fit based on the monitored temperature data.

Aspect 11. The method according to any of aspects 1-10, further comprising:
 storing the dynamic correction factor in a memory of the HVAC system controller.

Aspect 12. The method according to aspect 11, further comprising:
 operating the HVAC system using the stored dynamic correction factor.

Aspect 13. The method according to any of aspects 1-12, further comprising entering the dynamic calibration mode in response to receiving a user input.

Aspect 14. The method according to any of aspects 1-13, further comprising entering the dynamic calibration mode periodically.

Aspect 15. The method according to any of aspects 2-14, further comprising:
 predicting a thermal core temperature; and
 performing one or more actions based on the thermal core temperature.

Aspect 16. The method according to aspect 15, wherein the one or more actions include one of notifying a user and modifying one or more settings of the heating and/or cooling modes.

Aspect 17. A tangible computer accessible storage medium storing program instructions executable by a computer to execute a method for configuring a temperature control system of a heating, ventilation, and air conditioning (HVAC) system controller, the method comprising:
 enabling one or more fans in an HVAC system for a fan-enabled time period;
 monitoring a temperature determined by a plurality of sensors in the HVAC system during the fan-enabled time period;
 disabling the one or more fans in the HVAC system for a fan-disabled time period;

monitoring a temperature by the plurality of sensors in the HVAC system during the fan disabled time period; and determining, by the HVAC system controller, a dynamic correction factor for each of the plurality of sensors based on the temperatures monitored during the fan-enabled and fan-disabled time periods.

Aspect 18. The method according to aspect 17, further comprising:

enabling one of the heating mode and the cooling mode of the HVAC system.

Aspect 19. The method according to any of aspects 17-18, further comprising:

flagging one or more of the plurality of sensors in response to when the correction factor cannot be calculated for one or more of the plurality of sensors.

Aspect 20. The method according to aspect 19, further comprising:

providing an error message on the user interface indicating that the correction factor could not be calculated for the one or more of the plurality of sensors.

Aspect 21. The method according to any of aspects 17-20, further comprising:

storing the dynamic correction factor for each of the plurality of sensors.

Aspect 22. The method according to aspect 21, further comprising:

applying the dynamic correction factor for at least one of the plurality of sensors during operation of the HVAC system.

Aspect 23. The method according to any of aspects 18-22, further comprising:

predicting a thermal core temperature; and performing one or more actions based on the thermal core temperature.

Aspect 24. The method according to aspect 23, wherein the one or more actions include one of notifying a user and modifying one or more settings of the heating and/or cooling modes.

Aspect 25. A heating, ventilation, and air conditioning (HVAC) system controller, comprising:

a processor in communication with a memory and a user interface, wherein the processor is configured to:

enable one or more fans in an HVAC system for a fan-enabled time period;

monitor a temperature determined by a sensor in the HVAC system during the fan-enabled time period;

disable the one or more fans in the HVAC system for a fan-disabled time period;

monitor a temperature determined by a sensor in the HVAC system during the fan-disabled time period; and determine a dynamic correction factor based on the temperatures monitored in the fan-enabled and the fan-disabled time periods.

Aspect 26. The HVAC system controller according to aspect 25, wherein the user interface is a color liquid crystal display.

Aspect 27. The HVAC system controller according to any of aspects 25-26, wherein the HVAC system controller is configured to be in communication with one or more sensors in the HVAC system.

Aspect 28. A heating, ventilation, and air conditioning (HVAC) system controller comprising:

a processor in communication with a memory and a user interface, wherein the processor is configured to:

determine a dynamic parameter related to a dynamic property of a conditioned space; and maintain a controlled environment within the conditioned space by utilizing the dynamic parameter.

Aspect 29. The HVAC system controller according to aspect 28, wherein the dynamic property is moving air within the conditioned space.

Aspect 30. The HVAC system controller according to any of aspects 28-29, wherein the dynamic property is a temperature offset between air temperature and thermal mass temperature.

Aspect 31. The HVAC system controller according to any of aspects 28-30, wherein the dynamic property is the rate of change of temperature.

Aspect 32. The HVAC system controller according to aspect 31, wherein the dynamic property is a change of the rate of change of temperature.

Aspect 33. A tangible computer accessible storage medium storing program instructions executable by a computer to execute a method for controlling a heating, ventilation, and air conditioning (HVAC) system, the method comprising:

determining, by an HVAC system controller, a temperature measurement;

determining, by the HVAC system controller, a dynamic correction factor based on one or more dynamic parameters;

modifying, by the HVAC system controller, the temperature measurement based on the dynamic correction factor; and controlling, with the HVAC system controller, the HVAC system based on the modified temperature measurement.

Aspect 34. The method according to aspect 33, wherein determining the dynamic correction factor further comprises:

determining a state of the HVAC system based on an HVAC equipment.

Aspect 35. The method according to any of aspects 33-34, further comprising:

determining the dynamic correction factor further comprises determining a period of time the HVAC system has been in a current state.

Aspect 36. The method according to any of aspects 33-35, further comprising:

determining whether a dynamic calibration mode has been executed.

Aspect 37. The method according to aspect 36, further comprising:

setting the dynamic correction factor to a static correction value in response to determining the dynamic calibration mode has not been executed.

Aspect 38. The method according to any of aspects 33-37, wherein the dynamic correction factor corresponds to a sensor from which the temperature measurement is determined.

Aspect 39. The method according to aspect 34, further comprising:

predicting a thermal core temperature; and performing one or more actions based on the thermal core temperature.

Aspect 40. The method according to aspect 39, wherein the one or more actions include one of notifying a user and modifying one or more settings of the heating and/or cooling modes.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A tangible computer accessible storage medium storing program instructions executable by a computer to execute a method for configuring a temperature control system of a heating, ventilation, and air conditioning (HVAC) system controller, the method comprising:
    executing a dynamic calibration mode, the dynamic calibration mode including:
        enabling one or more fans in an HVAC system for a fan-enabled time period;
        monitoring temperature of a conditioned space determined by a sensor in the HVAC system during the fan-enabled time period;
        disabling the one or more fans in the HVAC system for a fan-disabled time period;
        monitoring temperature of the conditioned space by the sensor in the HVAC system during the fan-disabled time period; and
        determining, by the HVAC system controller, a dynamic correction factor based on the temperatures monitored during the fan-enabled and fan-disabled time periods.

2. The method according to claim 1, further comprising: enabling a cooling mode of the HVAC system during the fan-enabled time period.

3. The method according to claim 1, further comprising: enabling a heating mode of the HVAC system during the fan-enabled time period.

4. The method according to claim 1, further comprising: enabling all of the one or more fans in the HVAC system.

5. The method according to claim 4, wherein at least one of the one or more fans in the HVAC system is a variable speed fan and the enabling all of the one or more fans in the HVAC system includes enabling at least one of the one or more fans at different speeds.

6. The method according to claim 1, wherein the sensor is external to the HVAC system controller.

7. The method according to claim 1, wherein determining the dynamic correction factor comprises:
    calculating a curve-fit based on the monitored temperature data.

8. The method according to claim 1, further comprising: storing the dynamic correction factor in a memory of the HVAC system controller.

9. The method according to claim 8, further comprising: operating the HVAC system using the stored dynamic correction factor.

10. The method according to claim 1, further comprising: entering the dynamic calibration mode in response to receiving a user input.

11. The method according to claim 1, further comprising: entering the dynamic calibration mode periodically.

12. The method according to claim 2, further comprising: predicting a thermal core temperature; and
    performing one or more actions based on the thermal core temperature.

13. The method according to claim 12, wherein the one or more actions include one or more of notifying a user and modifying one or more settings of the heating and/or cooling modes.

14. A tangible computer accessible storage medium storing program instructions executable by a computer to execute a method for controlling a heating, ventilation, and air conditioning (HVAC) system, the method comprising:
    determining, by an HVAC system controller, a temperature measurement;
    determining, by the HVAC system controller, a dynamic correction factor based on one or more dynamic parameters, the determining a dynamic correction factor including determining whether a dynamic calibration mode has been executed;
    modifying, by the HVAC system controller, the temperature measurement based on the dynamic correction factor; and
    controlling, with the HVAC system controller, the HVAC system based on the modified temperature measurement.

15. The method according to claim 14, wherein determining the dynamic correction factor further comprises:
    determining a state of the HVAC system based on an HVAC equipment.

16. The method according to claim 14, further comprising:
    determining the dynamic correction factor further comprises determining a period of time the HVAC system has been in a current state.

17. The method according to claim 14, further comprising:
    setting the dynamic correction factor to a static correction value in response to determining the dynamic calibration mode has not been executed.

18. The method according to claim 14, wherein the dynamic correction factor corresponds to a sensor from which the temperature measurement is determined.

19. The method according to claim 15, further comprising:
    predicting a thermal core temperature; and
    performing one or more actions based on the thermal core temperature.

20. The method according to claim 19, wherein the one or more actions include one of notifying a user and modifying one or more settings of heating and/or cooling modes.

* * * * *